United States Patent
Kwak et al.

(10) Patent No.: US 10,062,362 B2
(45) Date of Patent: Aug. 28, 2018

(54) ELECTRONIC DEVICE INCLUDING HIDDEN DISPLAY AND METHOD FOR DISPLAYING INFORMATION THEREOF

(71) Applicant: Samsung Electronics Co., Ltd., Gyeonggi-do (KR)

(72) Inventors: Woongeun Kwak, Gyeonggi-do (KR); Jungsik Park, Gyeonggi-do (KR); Seungwon Oh, Seoul (KR); Doosuk Kang, Gyeonggi-do (KR); Kyungjung Kim, Gyeonggi-do (KR); Jinwoo Kim, Seoul (KR); Dohun Cha, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 18 days.

(21) Appl. No.: 15/252,538

(22) Filed: Aug. 31, 2016

(65) Prior Publication Data
US 2017/0069299 A1    Mar. 9, 2017

(30) Foreign Application Priority Data

Sep. 3, 2015    (KR) .......................... 10-2015-0125125

(51) Int. Cl.
*G06F 1/16*      (2006.01)
*G09G 5/37*      (2006.01)
*G06F 3/147*     (2006.01)

(52) U.S. Cl.
CPC ............... *G09G 5/37* (2013.01); *G06F 1/165* (2013.01); *G06F 1/1652* (2013.01);
(Continued)

(58) Field of Classification Search
None
See application file for complete search history.

(56) References Cited

U.S. PATENT DOCUMENTS 9,052,769 B2    6/2015  Choi et al.
2010/0060548 A1*  3/2010  Choi ..................... G06F 3/0414
                                                        345/1.3
(Continued)

FOREIGN PATENT DOCUMENTS

EP       3 001 650 A2    3/2016
KR    10-2010-0030114 A   3/2010
(Continued)

OTHER PUBLICATIONS

Klein "Elementary mathematics from an advanced standpoint. Arithmetic, algebra, analysis", ISBN 0-486-43480-X, 2004.*
(Continued)

*Primary Examiner* — Yingchun He
(74) *Attorney, Agent, or Firm* — Cha & Reiter, LLC.

(57) ABSTRACT

A method for displaying information at a foldable electronic device having a secondary display that is exposed when the foldable electronic device is folded, the method comprising: obtaining, by a processor, information associated with an exposure of the secondary display; displaying a first content item on the secondary display based on a size of an exposed area of the secondary display; and updating the secondary display in response to detecting a change in the size of the exposed area of the secondary display.

21 Claims, 33 Drawing Sheets

(52) U.S. Cl.
CPC ............ *G06F 1/1677* (2013.01); *G06F 3/147* (2013.01); *G09G 2340/04* (2013.01); *G09G 2360/04* (2013.01); *G09G 2380/02* (2013.01)

(56) References Cited

U.S. PATENT DOCUMENTS

| | | |
|---|---|---|
| 2012/0314399 A1 | 12/2012 | Bohn et al. |
| 2013/0205142 A1 | 8/2013 | Jung |
| 2014/0198036 A1 | 7/2014 | Kim et al. |
| 2014/0210706 A1 | 7/2014 | Park et al. |
| 2014/0313551 A1 | 10/2014 | Lyren et al. |
| 2014/0380186 A1 | 12/2014 | Kim et al. |
| 2015/0015525 A1 | 1/2015 | Cho et al. |
| 2015/0062025 A1 | 3/2015 | Lee et al. |
| 2016/0070305 A1* | 3/2016 | Kim ..................... G06F 1/1652 345/173 |

FOREIGN PATENT DOCUMENTS

| | | |
|---|---|---|
| KR | 10-2013-0127122 A | 11/2013 |
| KR | 10-2014-0095711 A | 8/2014 |
| KR | 10-2015-0099677 A | 9/2015 |

OTHER PUBLICATIONS

International Search Report, dated Dec. 9, 2016.
European Search Report dated Jun. 29, 2018.

\* cited by examiner

FIG. 6
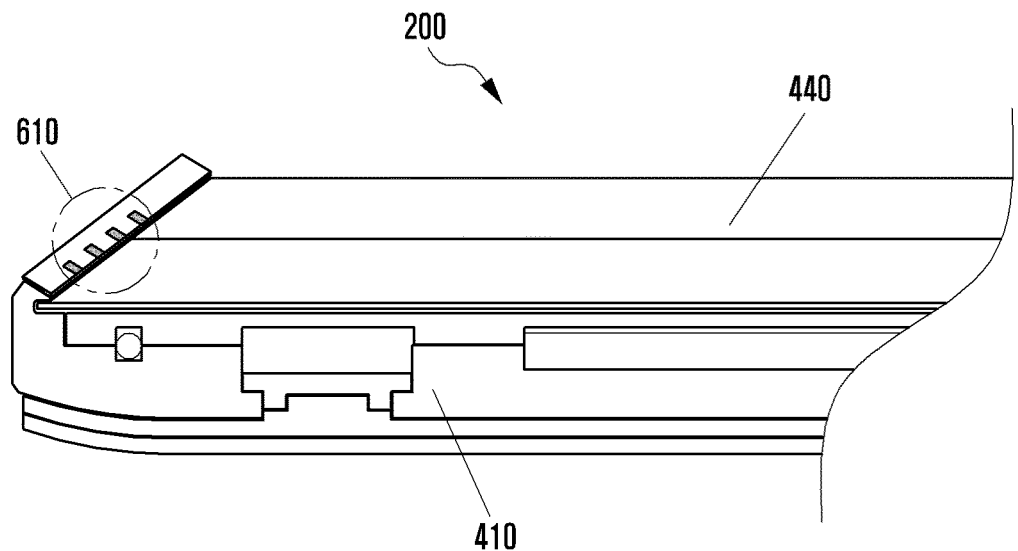
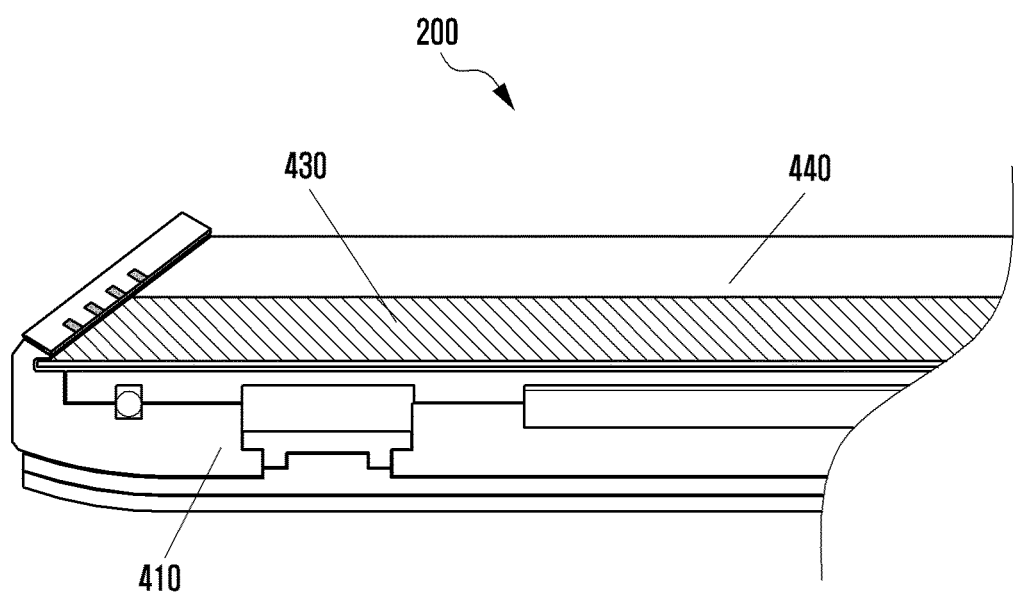

ELECTRONIC DEVICE INCLUDING HIDDEN DISPLAY AND METHOD FOR DISPLAYING INFORMATION THEREOF

CLAIM OF PRIORITY

This application claims the benefit of priority under 35 U.S.C. § 119(a) from Korean patent application filed on Sep. 3, 2015, in the Korean Intellectual Property Office and assigned Serial No. 10-2015-0125125, the entire disclosure of which is hereby incorporated by reference in its entirety.

TECHNICAL FIELD

The present disclosure relates to a foldable electronic device having a hidden display and a method for displaying information at the electronic device.

BACKGROUND

Recently, a variety of electronic devices having a flexible display have been developed and introduced.

For example, such a flexible display is applied to various kinds of electronic devices such as a smart phone, a tablet PC (Personal Computer), a PMP (Portable Multimedia Player), a PDA (Personal Digital Assistant), a laptop PC, and a wearable device, e.g., a wrist watch, an HMD (Head-Mounted Display), or the like.

An electronic device having a flexible display is often referred to as a foldable electronic device, which allows structural variations such as bending or folding.

SUMMARY

According to aspects of the disclosure, a method is provided for displaying information at a foldable electronic device having a secondary display that is exposed when the foldable electronic device is folded, the method comprising: obtaining, by a processor, information associated with an exposure of the secondary display; displaying a first content item on the secondary display based on a size of an exposed area of the secondary display; and updating the secondary display in response to detecting a change in the size of the exposed area of the secondary display.

According to aspects of the disclosure, an electronic device is provided comprising: a foldable body; a flexible primary display formed on one surface of the foldable body; a secondary display formed on another surface of the foldable body; a cover arranged to cover or expose the secondary display; and a memory; and at least one processor operatively coupled to the memory, configured to: obtain information associated with an exposure of the secondary display; display a first content item on the secondary display based on a size of an exposed area of the secondary display; and update the secondary display in response to detecting a change in the size of the exposed area of the secondary display.

According to aspects of the disclosure, a non-transitory computer readable-medium is provided that stores one or more processor-executable instructions which when executed by at least one processor cause the at least one processor to perform a method comprising the steps of: obtaining information associated with an exposure of a secondary display; displaying a first content item on the secondary display based on a size of an exposed area of the secondary display; and updating the secondary display in response to detecting a change in the size of the exposed area of the secondary display.

BRIEF DESCRIPTION OF THE DRAWINGS

FIG. 6 is a diagram of an example of an electronic device having a hidden display, according to various embodiments of the present disclosure;

DETAILED DESCRIPTION

Figure 1:
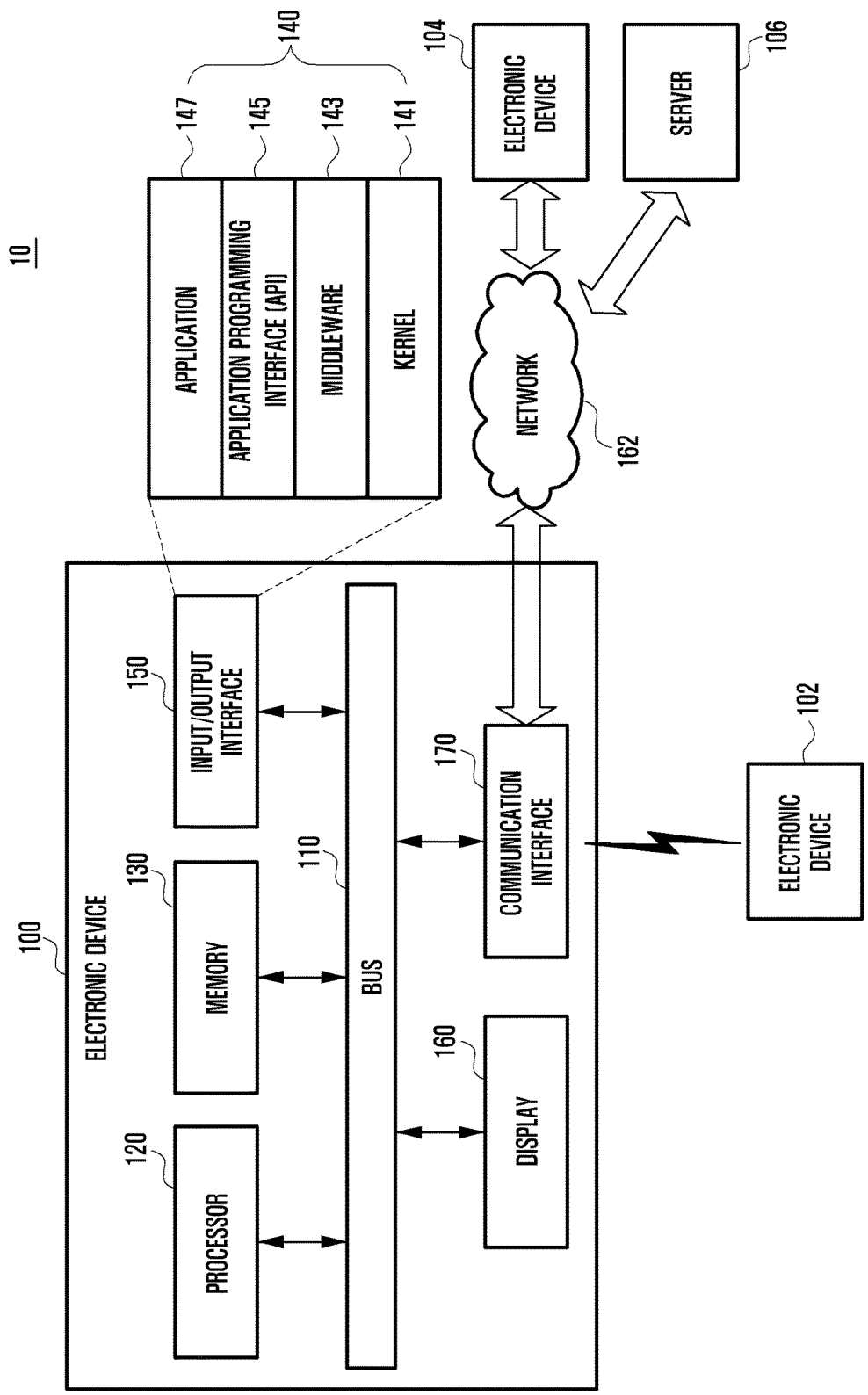
FIG. 1 is a diagram of an example of a network environment, according to various embodiments of the present disclosure.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may applicable to or be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessory, an electronic tattoo, and a smart watch.

According to some embodiments, the electronic device may be applicable or implemented as a smart home appliance having a communication function. The smart home appliance may include at least one of a television receiver (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of a network environment 10 including an electronic device 100, according to various embodiments of the present disclosure. Referring to FIG. 1, the electronic device 100 includes a bus 110, a processor 120, a memory 130, a input/output interface 150, a display 160 and a communication module or interface 170.

The bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In operation, the memory 130 stores commands or data received from the processor 120 or other components (for example, the input/output interface 150, the display 160, or the communication interface 170) or generated by the processor 120 or other components. The memory may be any non-transitory device to store data for later retrieval. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 100 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 establishes communication or connects communication between the electronic device 100 and the external device (for example, electronic device 102, 104 or server 106). For example, the communication interface 170 may access a network 162 through wireless or wired communication to communicate with the external device. The wireless communication may include at least one of, for example, WiFi, Bluetooth (BT), Near Field Communication (NFC), a Global Positioning System (GPS), and cellular communication, for example, Long-Term Evolution (LTE), Long-Term Evolution-Advanced (LTE-A), Code-Division Multiple Access (CDMA), Wideband Code-Division Multiple Access (WCDMA), Universal Mobile Telecommunications Service (UMTS), Wireless Broadband (WiBro) or Global System for Mobile Communications (GSM), and the like. The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 may support driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
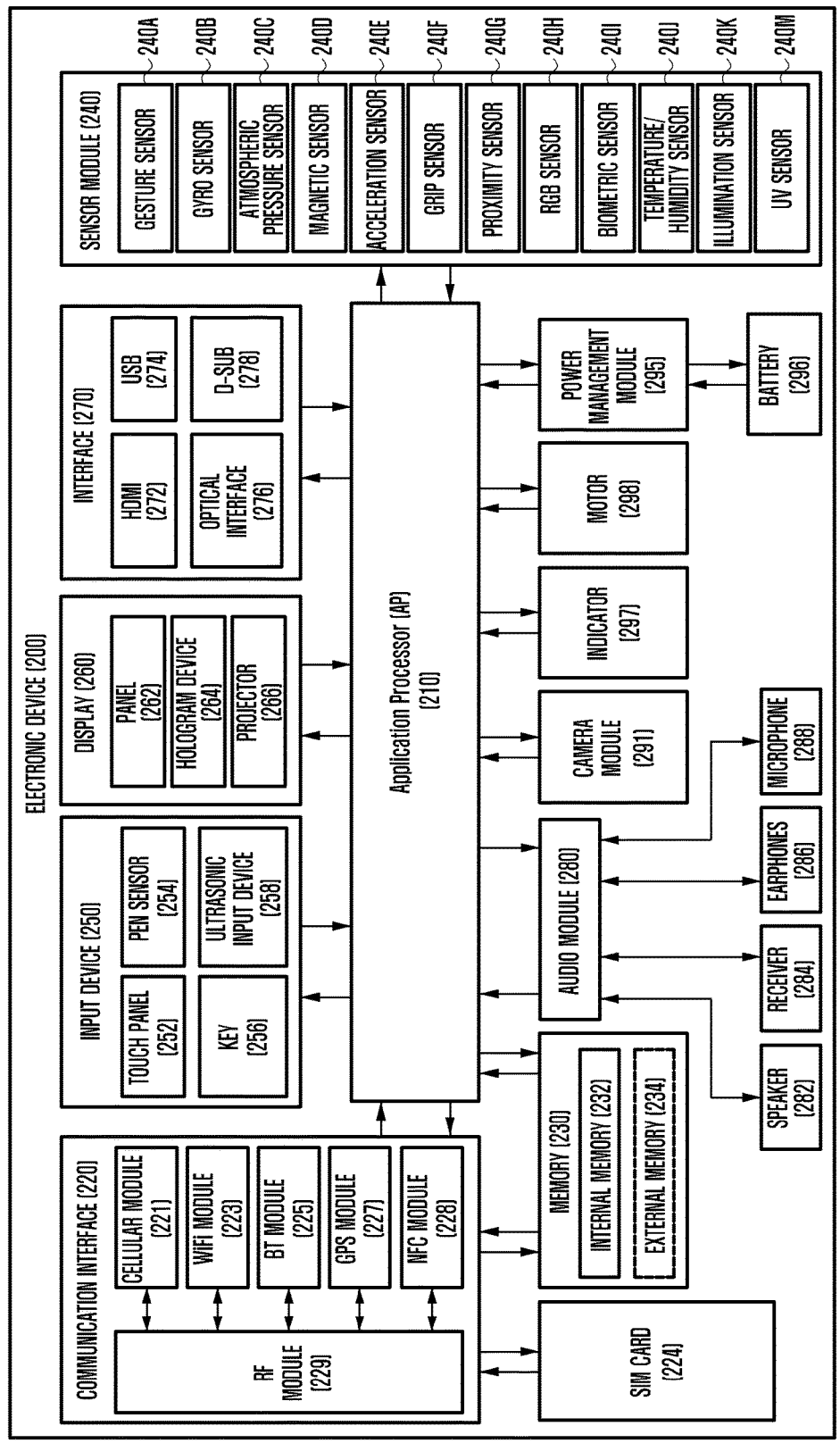
FIG. 2 is a diagram of an example of an electronic, device according to various embodiments of the present disclosure.

FIG. 2 is a diagram of an example of an electronic device 200, according to various embodiments of the present disclosure. The electronic device 200 may configure, for example, a whole or a part of the electronic device 100 illustrated in FIG. 1. Referring to FIG. 2, the electronic device 200 includes one or more Application Processors (APs) 210, a communication interface 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the AP 210 may further include a Graphic Processing Unit (GPU).

The communication interface 220 (for example, communication interface 170) transmits/receives data in communication between different electronic devices (for example, the electronic device 104 and the server 106 of FIG. 1) connected to the electronic device 200 (for example, electronic device 100 of FIG. 1) through a network. According to an embodiment, the communication interface 220 may include a cellular module 221, a WiFi module 223, a Bluetooth (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, a communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 2, at least some (for example, two or more) of the cellular module 221, the WiFi module 223, the BT module 225, the GPS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card Identifier (ICCID)) or subscriber information (for example, International Mobile Subscriber Identity (IMSI)).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 measures a physical quantity or detects an operation state of the electronic device 200, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication interface 220.

The display 260 (for example, display 160 of FIG. 1) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented as, for example, flexible, transparent, or wearable. The panel 262 may be configured by the touch panel 252 and one module. The hologram device 264 may show a stereoscopic image in the air by using interference of light. The projector 266 may project light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can generate a photograph of a still image and a video. According to an embodiment, the camera module 291 may include one or more image sensors (for example, a front sensor or a back sensor), an Image Signal Processor (ISP) (not shown) or a flash (for example, an Light Emitting Diode (LED) or xenon lamp).

The power management module 295 manages power of the electronic device 200. Although not illustrated, the power management module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. The power management module 295 may include a charging method may be divided into wired and wireless methods. In one example, the charger IC may charge a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
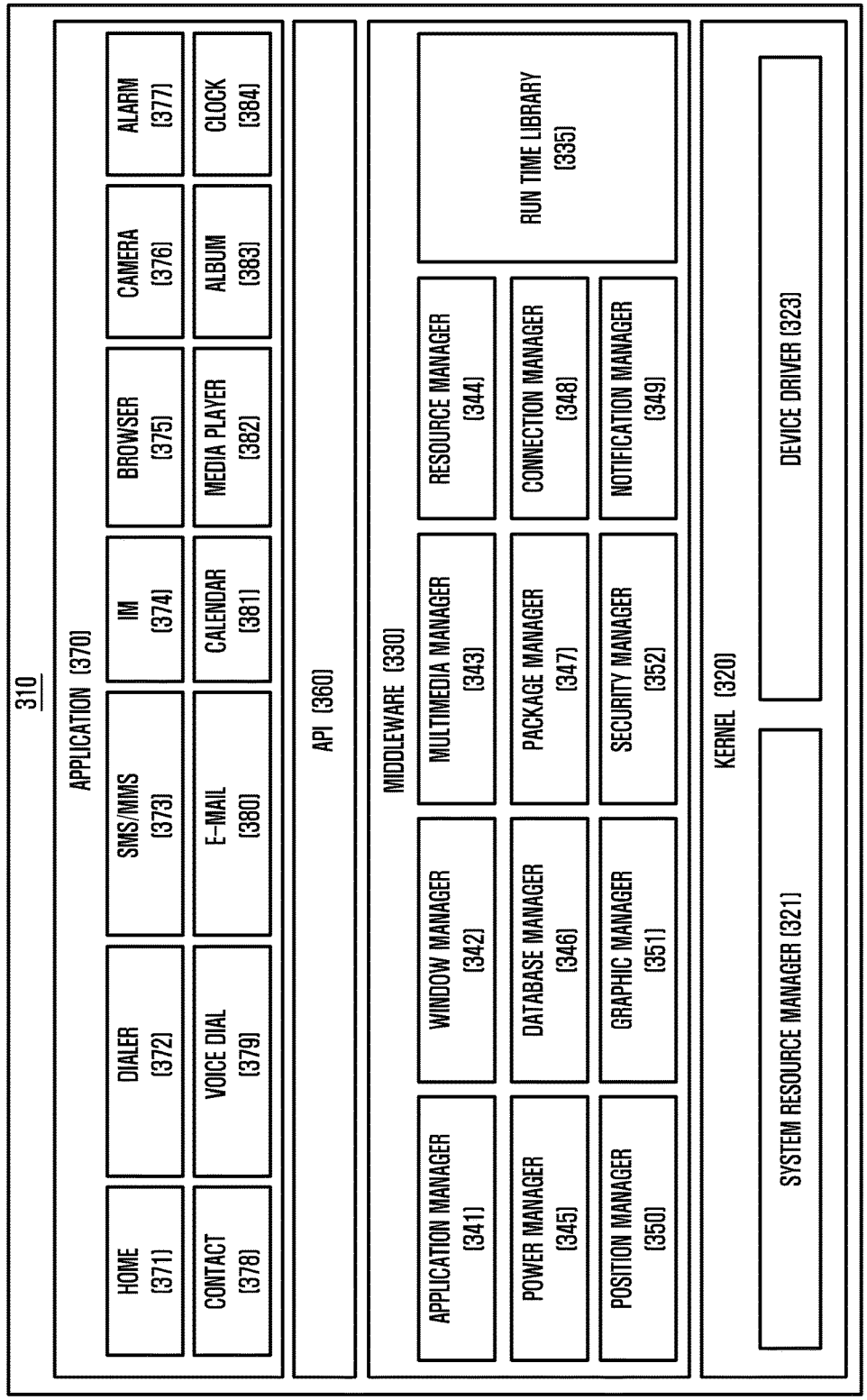
FIG. 3 is a diagram of an example of a program module, according to various embodiments of the present disclosure.

FIG. 3 is a block diagram of an example of a programming module 310, according to various embodiments of the present disclosure. The programming module 310 (for example, programming module 140) may be included (stored) in the electronic device 100 (for example, memory 130) illustrated in FIG. 1. At least some of the programming module 310 functionality may comprise or be formed of software, firmware, hardware, or a combination of at least two of software, firmware, and hardware. The programming module 310 may be executed in the hardware (for example, electronic device 200) to include an Operating System (OS) controlling resources related to the electronic device (for example, electronic device 100) or various applications (for example, applications 370) driving on the OS. For example, the OS may comprise Android, iOS, Windows, Symbian, Tizen, Bada or the like. Referring to FIG. 3, the programming module 310 includes a kernel 320, a middleware 330, an Application Programming Interface (API) 360, and applications 370.

The kernel 320 (for example, kernel 141 of FIG. 1) includes a system resource manager 321 and a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, an audio driver, and the like. Further, according to an embodiment, the device driver 323 may include an Inter-Process Communication (IPC) driver. The middleware 330 includes a plurality of modules prepared in advance to provide functions required in common by the applications 370. Further, the middleware 330 provides functions through the API 360 to allow the application 370 to efficiently use limited system resources within the electronic device. For example, as illustrated in FIG. 3, the middleware 300 (for example, middleware 143 of FIG. 1) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145 of FIG. 1) is a set of API programming functions, and may be provided with a different configuration according to an operating system. For example, in Android or iOS, a single API set may be provided for each platform. In Tizen, two or more API sets may be provided. The applications 370, which may include an application similar to the application 147 of FIG. 1, may include, for example, a preloaded application and/or a third party application. The applications 370 may include a home application 371, a dialer application 372, a Short Messaging Service (SMS)/Multlimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 310, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4A:
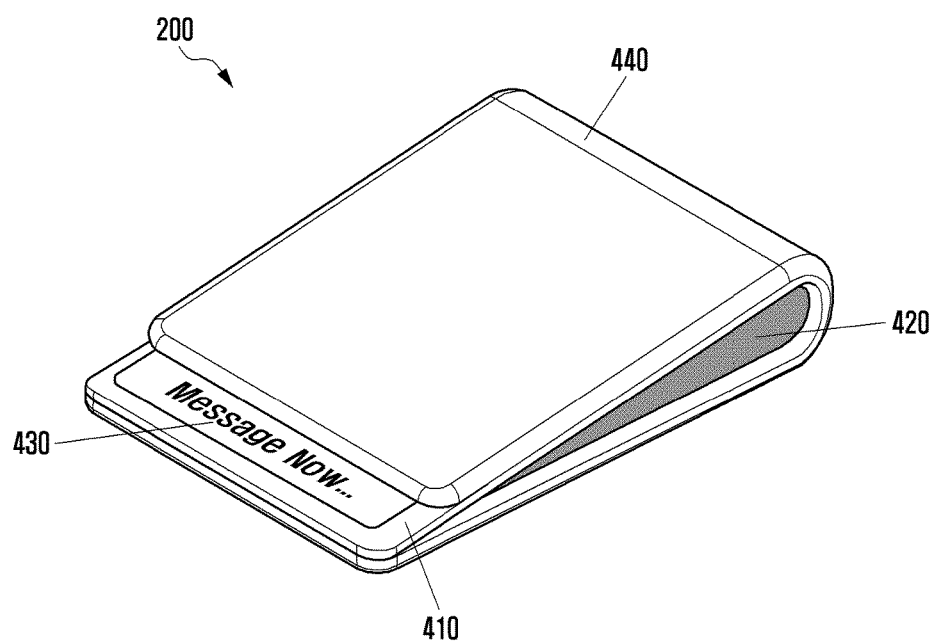
FIG. 4A is a diagram of an example of an electronic device having a hidden display, according to various embodiments of the present disclosure.
Figure 4B:
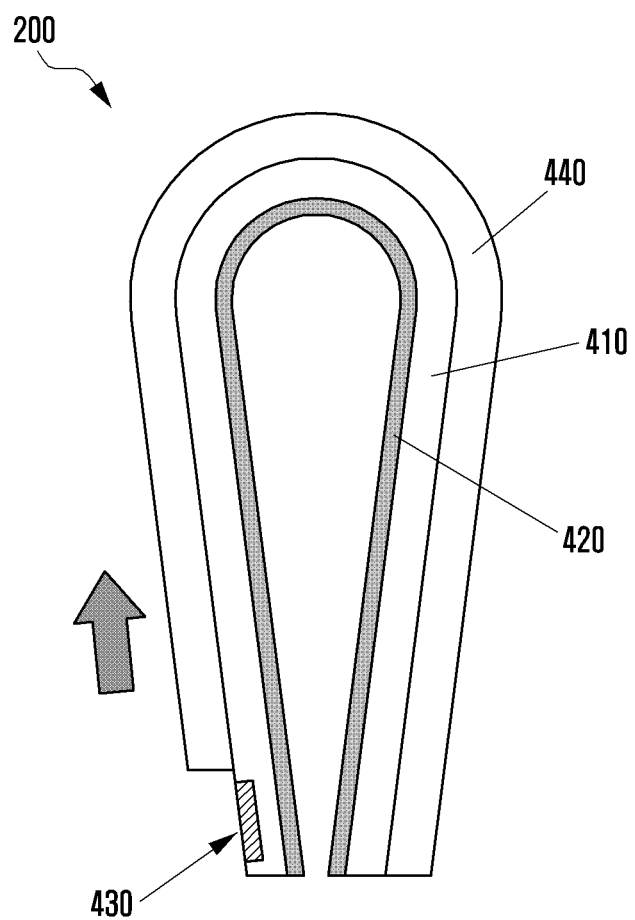
FIG. 4B is a diagram of an example of an electronic device having a hidden display, according to various embodiments of the present disclosure.
Figure 4C:
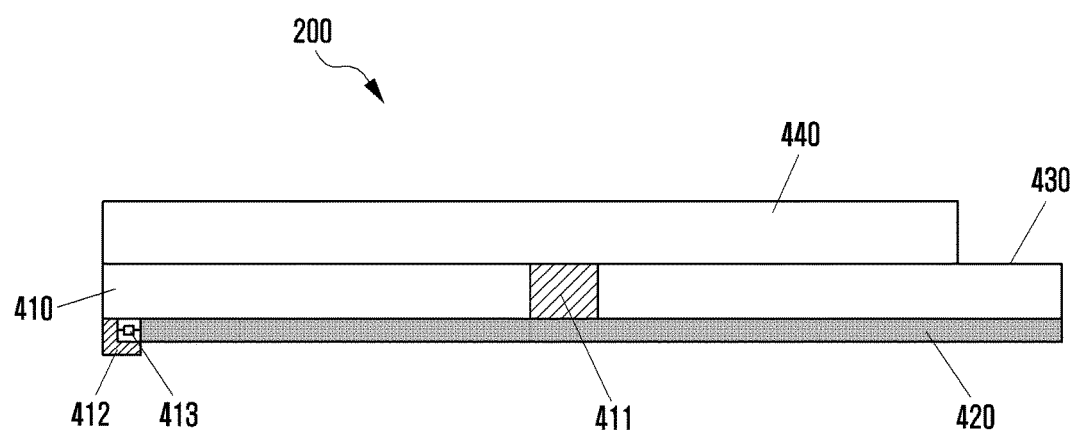
FIG. 4C is a diagram of an example of an electronic device having a hidden display, according to various embodiments of the present disclosure.

FIGS. 4A to 4C are diagrams illustrating an example of an electronic device 200 including a secondary display 430, according to various embodiments of the present disclosure.

Specifically, FIG. 4A is a perspective view of the electronic device 200 having the secondary display 430, and FIG. 4B is a side view of the electronic device 200 being folded.

In FIGS. 4A and 4B, the electronic device 200 may include a main body 410, a main display 420, the secondary display 430, and a cover 440.

According to aspects of the disclosure, the main body 410 and the main display 420 may be arranged to slide with respect to each other. In this regard, the main body 410 may include a guide and/or groove acting as a path through which the main display 420 can slide.

The main body 410 may include various components implemented therein, such as a processor (e.g., the AP 210), the memory 230, the sensor module 240, the input unit 250, and the battery 296 of FIG. 1.

The main body 410 may be formed of a flexible material which can be folded or bent when the flexible main display 420 is folded or bent.

A circuit board, which the above-mentioned components implemented may be mounted on or electrically connected to, may be also formed of a flexible material.

In another embodiment, the above-mentioned components implemented in the main body 410 may be also formed of a flexible material so as to be folded or bent.

The main display 420 may be formed of a flexible material. The main display 420 and the secondary display 430 may be the same as or similar to the display 160 of FIG. 1 or the display 260 of FIG. 2.

When the electronic device 200 is folded, the main display 420 may become positioned in the interior of the electronic device 200 and thus protected by both the main body 410 and the cover 440.

The main display 420 may be a transparent display. Together with at least a part of the secondary display 430, the main display 420 may display information thereon.

The secondary display 430 is provided to the electronic device 200, separately from the main display 420. Namely, the main display 420 may be formed on one surface of the main body 410, whereas the secondary display 430 may be formed on another surface.

The secondary display 430 may be formed at an upper region and/or a lower region of the main body 410. The secondary display 430 may display information depending on a structural variation of the electronic device 200 (e.g., when the electronic device 200 is folded or bent).

The secondary display 430 may be formed as a transparent display. Together with at least a part of the main display 420, the secondary display 430 may display information.

The cover 440 may be formed on the surface of the main body where the secondary display 430 is formed. The cover 440 may be bent or folded depending on a structural variation of the electronic device 200 (e.g., when the electronic device 200 is folded or bent).

Also depending on a structural variation of the electronic device 200 (e.g., when the electronic device 200 is folded or bent), the cover 440 may hide or expose the secondary display 430 formed at the upper region and/or the lower region of the main body 410.

FIG. 4C is a cross-sectional view of the electronic device 200 having the secondary display 430, according to various embodiments of this disclosure.

The main body 410 may further include a hinge part 411, a receptible part 412, and a resilient part 413.

The hinge part 411 acts as a supporting point when the main body 410, the cover 440, and/or the main display 420 are bent or folded. Namely, based on the hinge part 411, the main body 410, the cover 440, and/or the main display 420 may be transformed structurally.

The receptible part 412 may cover a part of the main display 420. The receptible part 412 may be connected with the resilient part 413 and thereby prevent the main display 420 from being separated from the main body 410.

In various embodiments, when the main body 410, the cover 440, and/or the main display 420 are bent or folded, the receptible part 412 may receive a portion of the main display 420.

In various embodiments, when the main body 410, the cover 440, and/or the main display 420 are unfolded, the receptible part 412 may expose the received portion of the main display 420 to the outside.

The resilient part 413 is connected between the receptible part 412 and the main display 420. When the main display 420 is transformed structurally, the resilient part 413 may offer resilience between the receptible part 412 and the main display 420 and thereby prevent the main display 420 from being separated from the receptible part 412.

Figure 5:
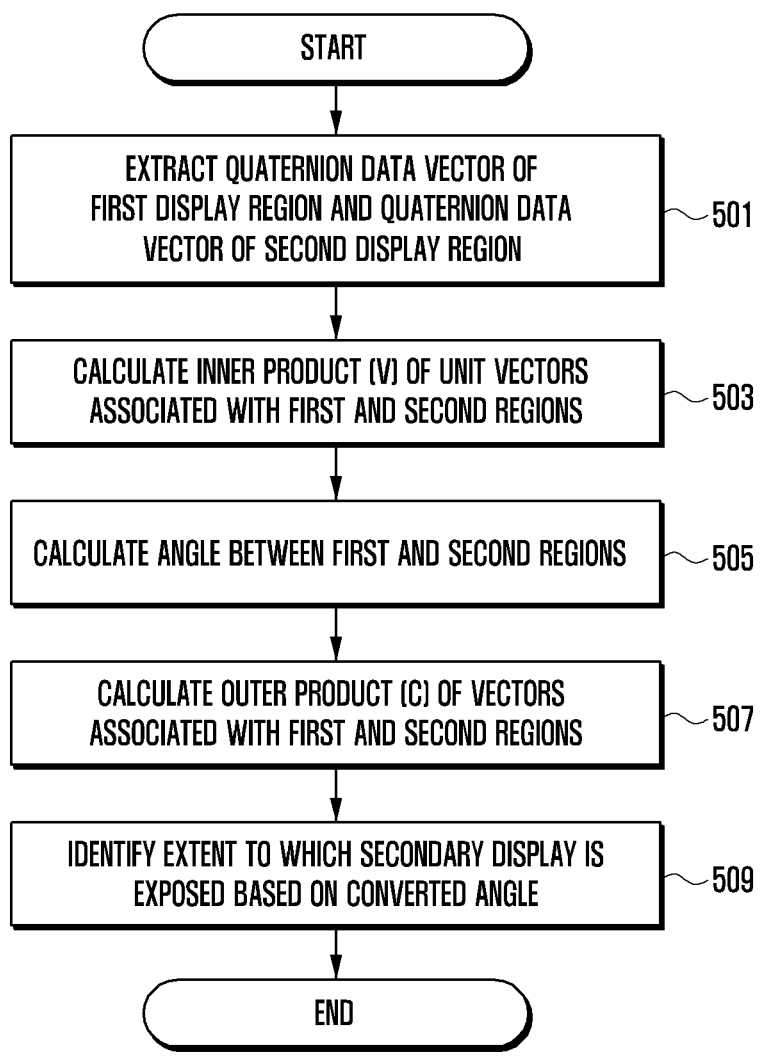
FIG. 5 is a flowchart of an example of a process, according to various embodiments of the present disclosure.

FIG. 5 is a flowchart of an example of a process, according to various embodiments of the present disclosure.

At operation 501, the electronic device 200 may extract, using a 6-axis sensor, a quaternion data vector of the first region of the main display 420 and a quaternion data vector of the second region of the main display 420.

The 6-axis sensor may be a sensor that uses three axes (X, Y, Z) of the acceleration sensor 240E for sensing a spatial motion and also uses three axes (X, Y, Z) of the gyro sensor 240B for sensing orientation.

In various embodiments, the electronic device 200 may be folded or bent on the hinge part 411 located centrally therein. When the electronic device 200 is folded or bent, the main display 420 may be also folded or bent on the hinge part 411, so that folded regions of the main display 420 may face each other.

According to aspects of the disclosure, when the electronic device is folded, a first region of the main display may be disposed on one side of the fold, whereas a second region of the main display may be disposed on the other side of the fold.

At operation 503, the electronic device 200 may calculate an inner product (v) of unit vectors associated with the first and second regions of the main display 420. Each of the unit vectors may be calculated based on a different one of the quaternion data vectors.

At operation 505, the electronic device 200 may calculate an angle between the first and second regions of the main display 420 by using the calculated inner product (v). In various embodiments, this angle may be calculated using Equation 1.

$$\text{angle} = \cos^{-1} v \times 180/\pi \qquad \text{<Equation 1>}$$

At operation 507, the electronic device 200 may calculate an outer product (c) of vectors associated with the first and second regions of the main display 420.

The electronic device 200 may then convert the calculated angle to the 360-degree scale by using both the calculated inner product (v) and the calculated outer product (c).

At operation 509, the electronic device 200 may determine the extent to which the secondary display is exposed as a result of the folding/bending of the electronic device. Depending on the extracted angle between the first and second regions of the main display 420, the electronic device 200 may determine whether the secondary display 430 protected by the cover 440 is exposed and how much the secondary display 430 is exposed.

FIG. 6 is a diagram of an example of an electronic device having a secondary display, according to various embodiments of the present disclosure. More particularly, FIG. 6 illustrates the manner in which the electronic device obtains information associated with the exposure of the secondary display 430 included in the electronic device 200.

As illustrated, the main body 410 and the cover 440 may be arranged to slide with respect to each other. In this regard, the main body 410 may include a guide and/or groove acting as a path through which the cover 440 can slide.

Additionally, the main body 410 may include, at the guide and/or groove, a sensor or switch 610 that detects the movement of the cover 440.

By detecting the movement of the cover 440 through the sensor or switch 610, the electronic device 200 may determine the exposure or not of the secondary display 430 and the extent of such exposure.

Figure 7:
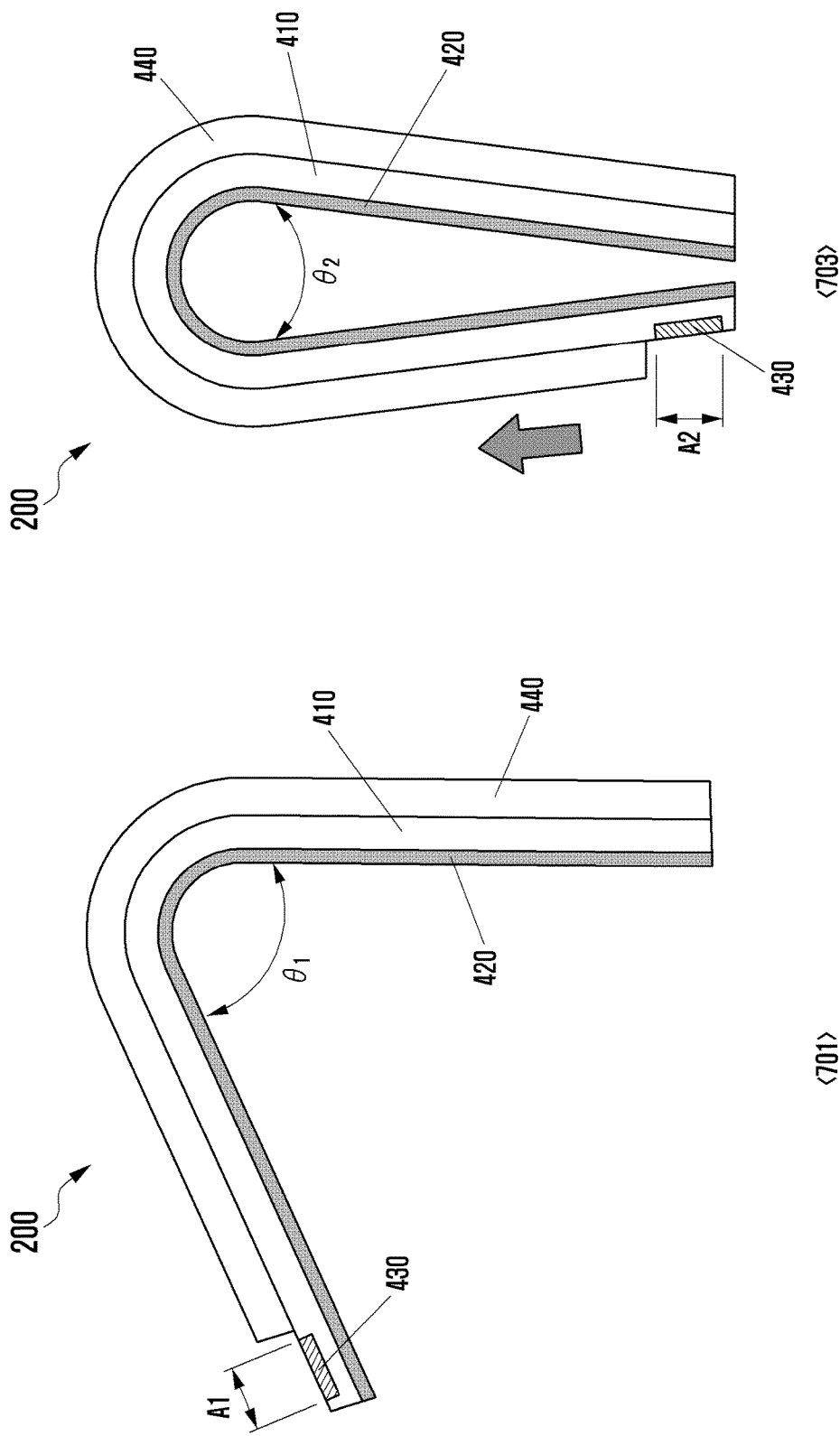
FIG. 7 is a diagram of an example of an electronic device having a hidden display, according to various embodiments of the present disclosure.

FIG. 7 is a diagram of an example of an electronic device having a secondary display, according to various embodiments of the present disclosure. More particularly, FIG. 7 illustrates how the exposed portion of the secondary display 430 varies in size depending on the degree to which the electronic device 200 is bent.

As indicated by a reference numeral 701, when the electronic device 200 is bent incompletely, an angle between the first and second regions of the main display 420 may be the first angle ($\theta 1$).

The electronic device 200 may calculate the first angle ($\theta 1$) by using the 6-axis sensor. In such circumstances, based on the calculated first angle ($\theta 1$), the electronic device 200 may recognize that the cover 440 exposes the secondary display 430 by the first area (A1).

In various embodiments, when the electronic device 200 is bent incompletely, the electronic device 200 may detect the movement of the cover 440 through the sensor or switch 610, thereby recognizing that the cover 440 exposes the secondary display 430 by the first area (A1).

As indicated by a reference numeral 703, when the electronic device 200 is completely bent, an angle between the first and second regions of the main display 420 may be the second angle ($\theta 2$).

The electronic device 200 may calculate the second angle ($\theta 2$) by using the 6-axis sensor. In such circumstances, based on the calculated second angle ($\theta 2$), the electronic device 200 may recognize that the cover 440 exposes the secondary display 430 by the second area (A2).

In various embodiments, when the electronic device 200 is completely bent, the electronic device 200 may detect the movement of the cover 440 through the sensor or switch 610, thereby recognizing that the cover 440 exposes the secondary display 430 by the second area (A2).

Figure 8A:
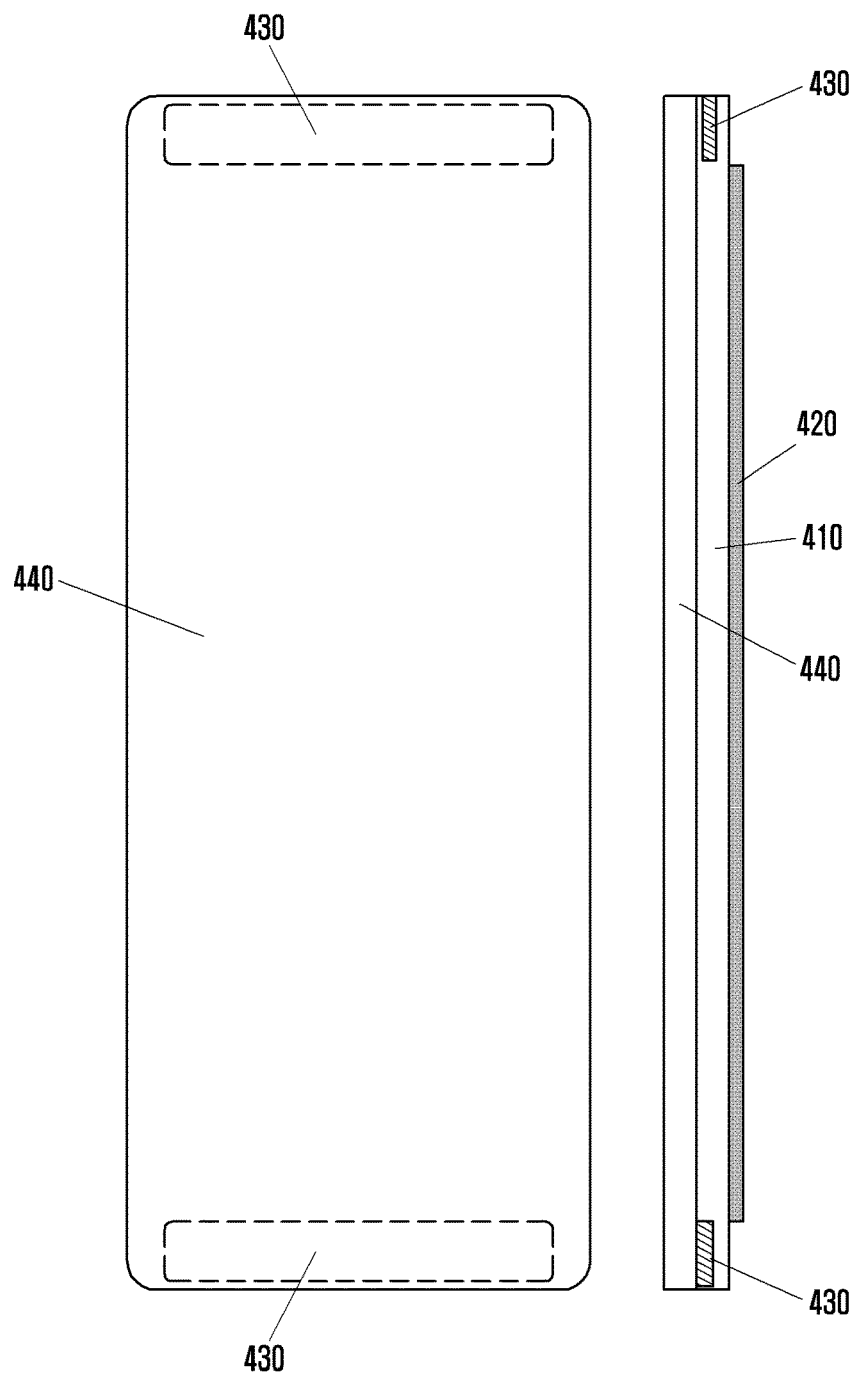
FIG. 8A is a diagram of an example of an electronic device having a hidden display, according to various embodiments of the present disclosure.
Figure 8B:
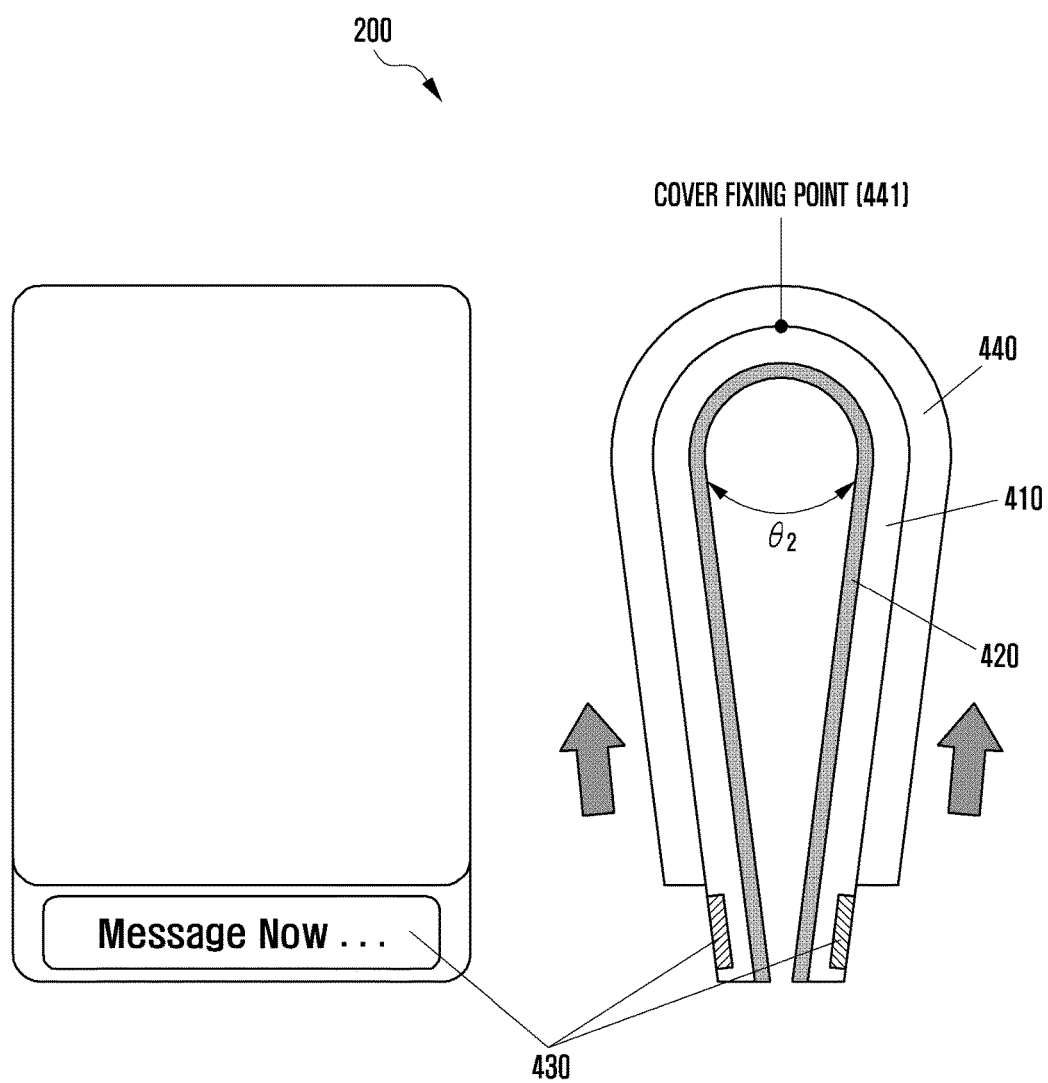
FIG. 8B is a diagram of an example of an electronic device having a hidden display, according to various embodiments of the present disclosure.

FIGS. 8A-B are diagrams of examples of an electronic device having a secondary display, according to various embodiments of the present disclosure.

As shown in FIG. 8A, the electronic device 200 may include at least one or more secondary displays 430.

The at least one or more secondary displays 430 may be formed at the upper region and/or lower region of the main body 410. The at least one or more secondary displays 430 may display information, depending on a structural variation of the electronic device 200 (e.g., when the electronic device 200 is folded or bent).

When the electronic device 200 is unfolded as shown in FIG. 8A, the at least one or more secondary displays 430 may be exposed slightly or covered entirely.

In various embodiments, when the electronic device 200 is unfolded, the at least one or more secondary displays 430 may be covered with the cover 440.

When the electronic device 200 is folded or bent as shown in FIG. 8B, the at least one or more secondary displays 430 may be exposed partially or totally. The greater the extent to which the electronic device 200 is bent, the greater the exposed area of the secondary displays 430. As illustrated in FIG. 8B, the exposed area of a given one of the secondary displays may be a portion of the second display that is visible to the user and/or does not overlap with the cover 440. In FIG. 8B, a cover fixing point 441 may be identical to the hinge part 411 discussed above.

Figure 9:
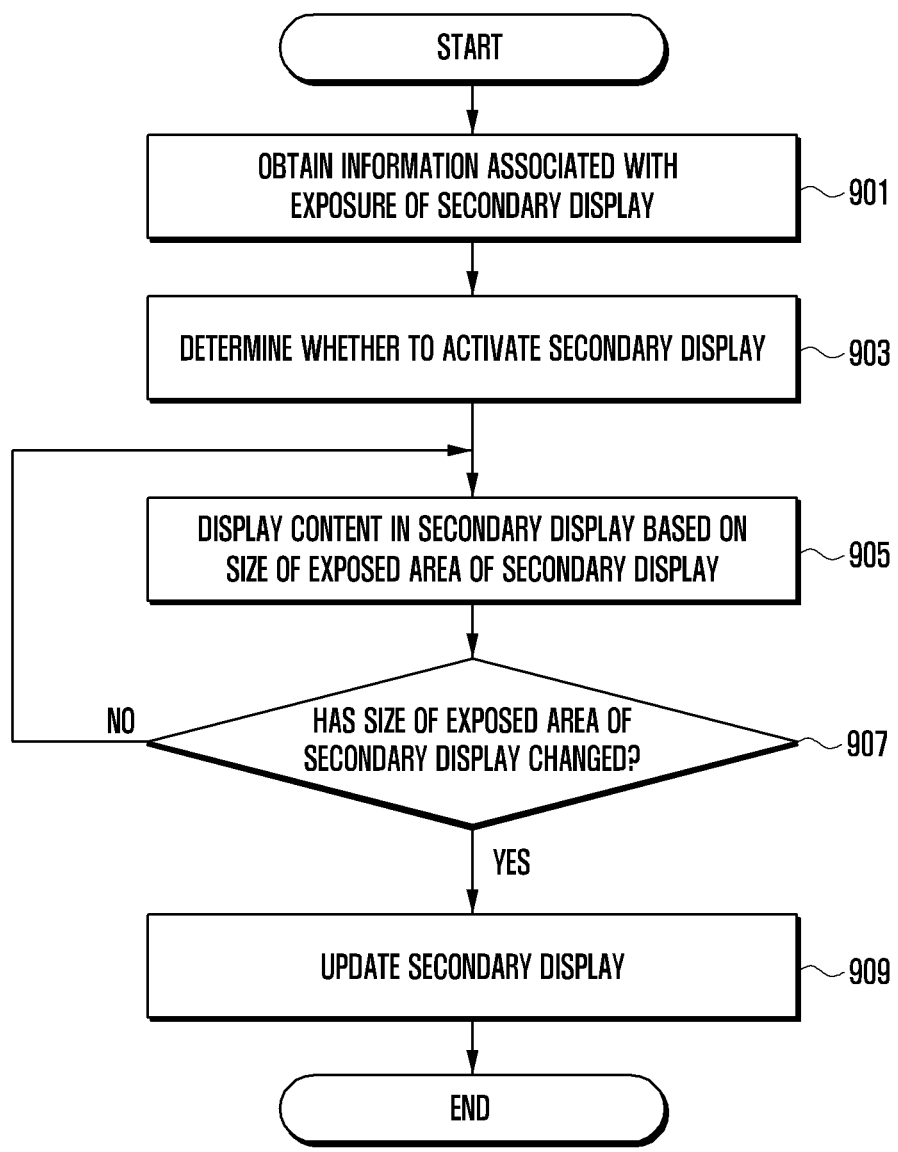
FIG. 9 is a flowchart of an example of a process, according to various embodiments of the present disclosure.

FIG. 9 is a flowchart of an example of a process, according to various embodiments of the present disclosure.

At operation 901, the electronic device 200 may obtain information associated with the exposure of the secondary display 430.

Namely, as discussed above, the electronic device 200 may detect, by using the 6-axis sensor or the sensor or switch 610, the movement of the cover 440 resulting from a structural variation thereof and thereby obtain information which indicates at least one of: (i) whether the secondary display 430 is exposed, and (ii) the extent to which the secondary display 430 is exposed (e.g., the size of the exposed area of the secondary display). For example, this information may be information about an exposed area of the secondary display 430.

At operation 903, the electronic device 200 may determine whether to activate the secondary display 430.

For example, based on the obtained information associated with the exposure of the secondary display 430, the electronic device 200 may determine whether a condition for activating the secondary display is satisfied. According to various embodiments, at operation 903, the electronic device 200 may determine whether to activate the display based on the size of an exposed area of the secondary display 430.

In this example, it may be set to start a display operation on the secondary display 430 when the exposed area of the secondary display 430 is greater than a threshold (e.g., greater than a predetermined percentage of the entire area of the secondary display 430).

According to various embodiments, at operation 903, the electronic device 200 may be set to start a display operation on the secondary display 430 when the exposed area of the secondary display 430 is greater than a user-defined area.

According to various embodiments, at operation 903, the electronic device 200 may be set to start a display operation on the secondary display 430 when an exposed position of the secondary display 430 coincides with a user's eye gaze.

At operation 905, the electronic device 200 may display contents or information based on the size of the exposed area of the secondary display 430.

According to various embodiments, the electronic device 200 may display totally or partially contents or information by considering the exposed area of the secondary display 430.

According to various embodiments, the electronic device 200 may display text articles or icons based on the size of the exposed area of the secondary display 430.

According to various embodiments, the electronic device 200 may display contents or information in proportion to the exposed area of the secondary display 430. Further, in proportion to the size of the exposed area of the secondary display 430, the electronic device 200 may add or remove contents or information.

According to various embodiments, the amount of contents or information to be displayed may be increased or decreased in proportion to the exposed area of the secondary display 430.

According to various embodiments, the brightness of the secondary display 430 may be varied based on the size of the exposed area of the secondary display 430.

At operation 907, the electronic device 200 determines whether there is a change in the size of the exposed area of the secondary display 430.

If the size of the exposed area of the secondary display 430 is changed, the electronic device 200 may update information displayed on the secondary display 430 depending on such a variation, at operation 909. Otherwise, if the exposed area of the secondary display 430 is not changed, then the process returns to operation 905.

Figure 10:
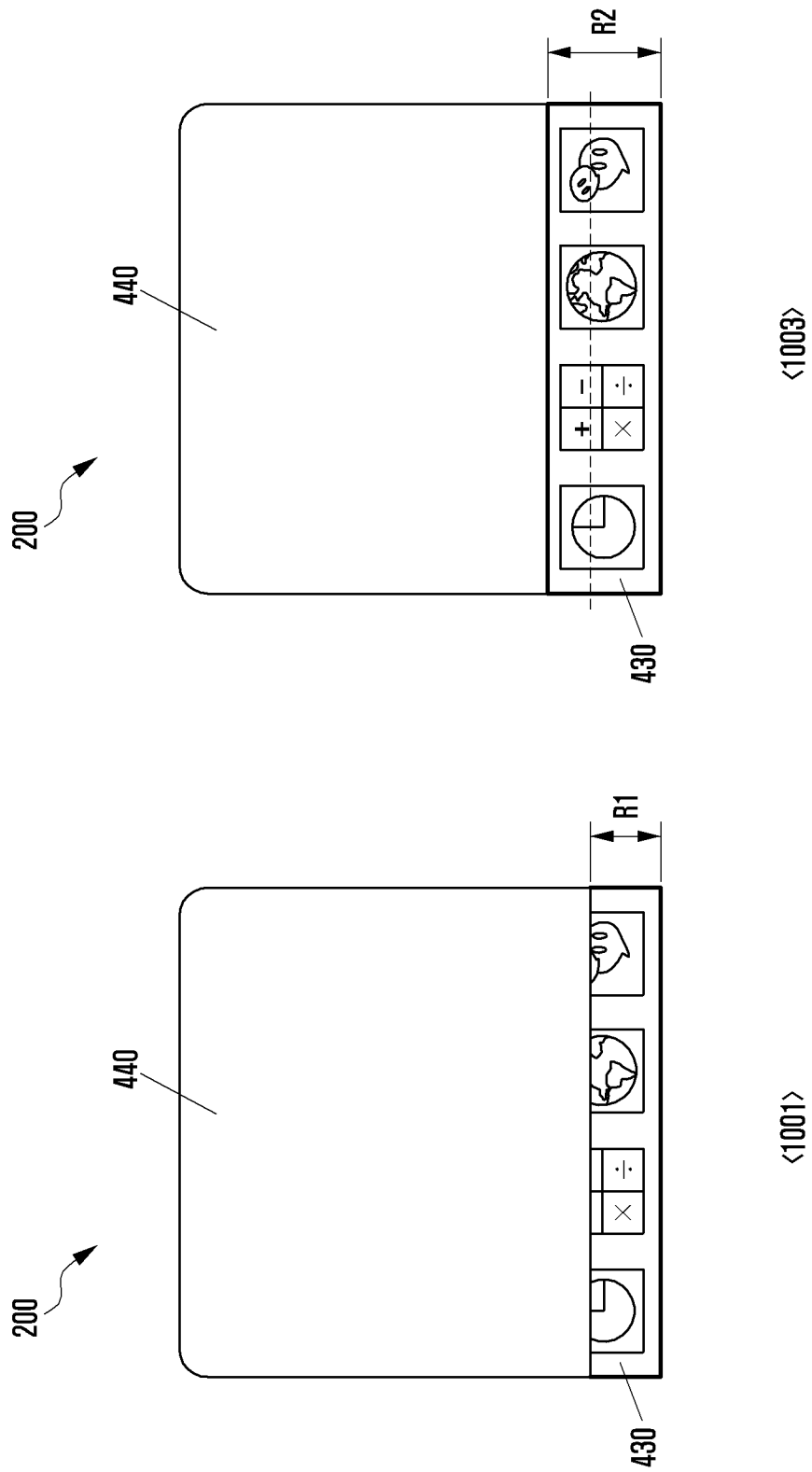
FIG. 10 is a diagram of an example of a user interface, according to various embodiments of the present disclosure.

FIG. 10 is a diagram of an example of a user interface, according to various embodiments of the present disclosure.

As shown in screenshot 1001, when the movement of the cover 440 causes the secondary display 430 to be exposed by the first area R1, the secondary display 430 may partially display icons.

Referring to screenshot 1003, when the secondary display 430 is exposed by the second area R2, icons are completely displayed on the secondary display 430. However, if the secondary display 430 is exposed by the first area R1 which is smaller than the second area R2, such icons are partially displayed on the secondary display 430.

Partially displaying the respective individual icons gives an effect as if each individual icon is partially covered with the cover 440.

In various environments, each individual icon may be displayed in a size directly proportional to the size of the exposed area (e.g., R1 or R2) of the secondary display 430. Namely, each icon may be resized depending on the size of the exposed area (e.g., R1 or R2) so as to be displayed entirely.

In this regard, if the size of the exposed area of the secondary display 430 changes while the electronic device 200 performs an operation of displaying information as shown in screenshot 1001 or 1003, the electronic device 200 may update such information to be displayed on the secondary display 430.

For example, if the exposed area of the secondary display 430 is expanded as shown in screenshot 1003 while icons are partially displayed on the secondary display 430 as shown in screenshot 1001, these icons may be completely displayed.

On the contrary, if the size of the exposed area of the secondary display 430 is decreased as shown in screenshot 1001 while icons are completely displayed on the secondary display 430 as shown in screenshot 1003, these icons may become partially displayed.

Stated succinctly, when the exposed area of the secondary display 430 has size R1, only a portion of a given content item (e.g., a calculator icon) may be displayed. However, when the exposed area is enlarged to size R2, the entire content item may become displayed.

Figure 11:
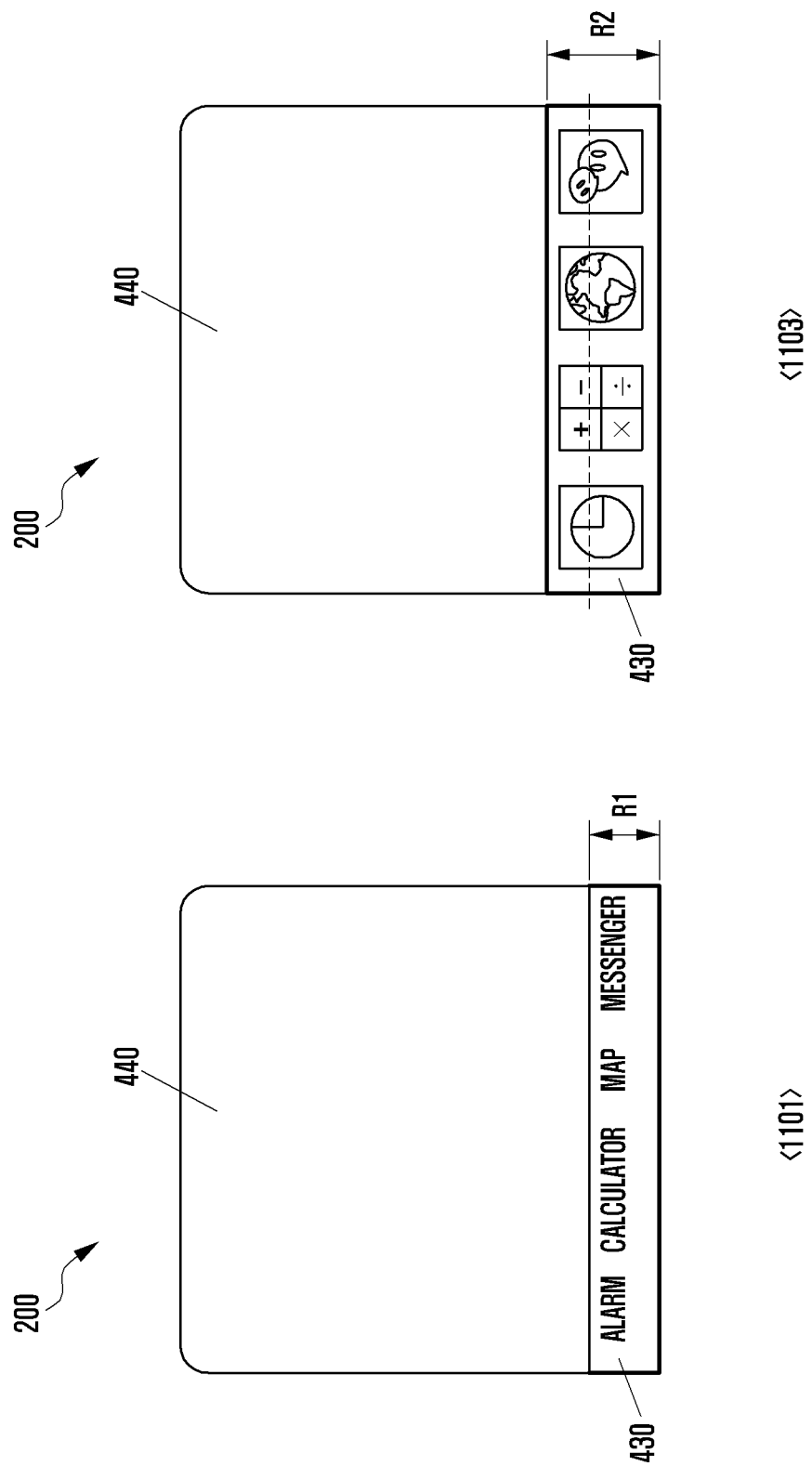
FIG. 11 is a diagram of an example of a user interface, according to various embodiments of the present disclosure.

FIG. 11 is a diagram of an example of a user interface, according to various embodiments of the present disclosure.

As shown in screenshot 1101, when the movement of the cover 440 causes the secondary display 430 to be exposed by the first area R1, the secondary display 430 may display text data.

The details in this example are as follows.

Referring to screenshot 1103, when the secondary display 430 is exposed by the second area R2, icons are displayed on the secondary display 430. However, if the secondary display 430 is exposed by the first area R1 which is smaller than the second area R2, corresponding text data, instead of icons, is displayed on the secondary display 430.

Each icon and corresponding text data may have the same functionality. For example, in example text data indicates 'calculator', this may correspond to a calculator icon.

Like this, if the exposed area of the secondary display 430 is varied while the electronic device 200 performs an operation of displaying information as shown in screenshot 1101 or 1103, the electronic device 200 may update such information to be displayed on the secondary display 430.

For example, if the exposed area of the secondary display 430 is expanded as shown in screenshot 1103 while text data is displayed on the secondary display 430 as shown in screenshot 1101, the secondary display 430 may replace text data with corresponding icons.

On the contrary, if the exposed area of the secondary display 430 is contracted as shown in screenshot 1101 while icons are displayed on the secondary display 430 as shown in screenshot 1103, the secondary display 430 may replace icons with corresponding text data.

Stated succinctly, when the exposed area of the secondary display 430 has size R1, the electronic device 200 may display a first content item on the secondary display (e.g., the word "calculator"). However, when the exposed area is enlarged to size R2, the electronic device 200 may replace the first content item with a second content item (e.g., the calculator icon). As illustrated, the first content item and the second content item may be different content items that have the same function.

Figure 12:
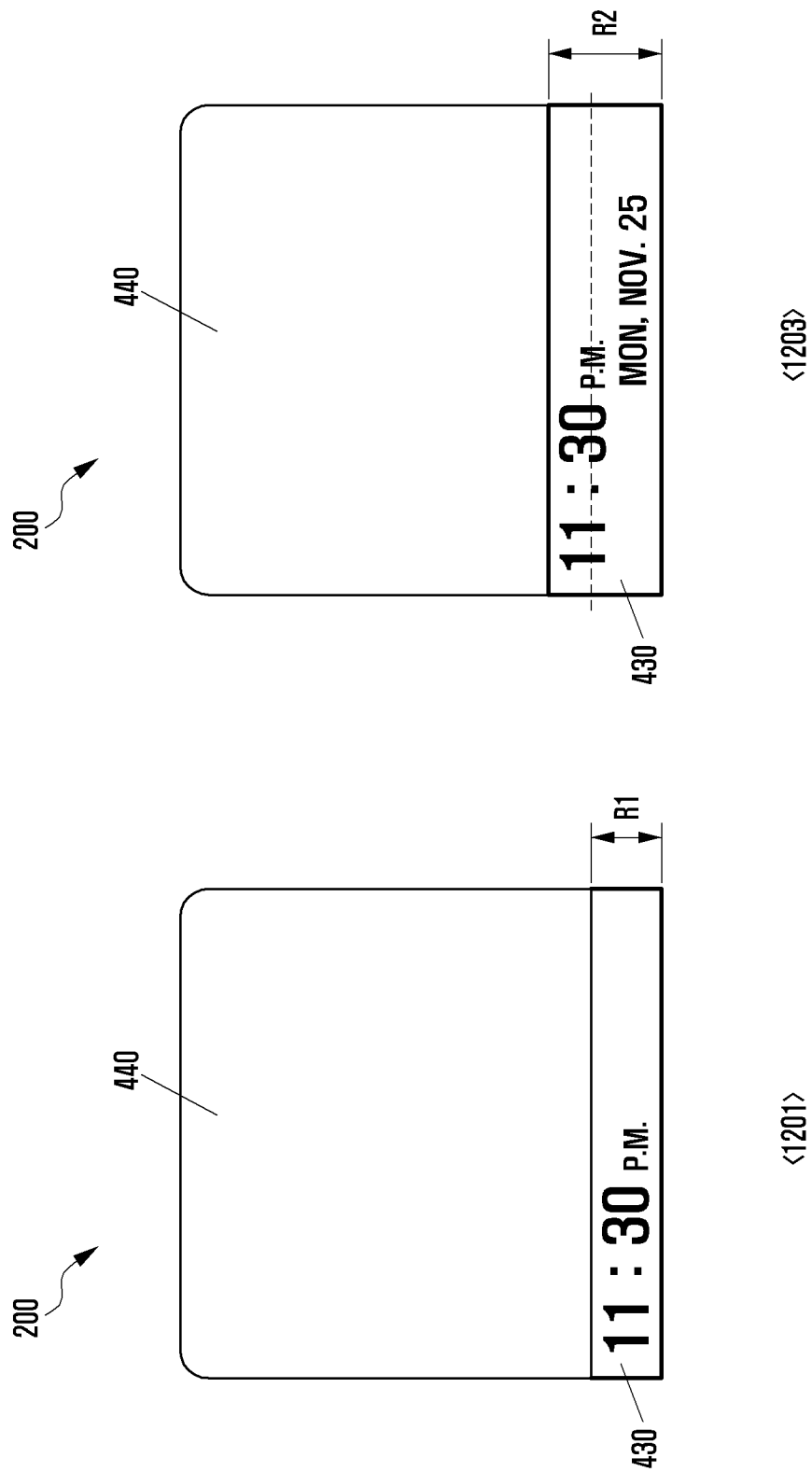
FIG. 12 is a diagram of an example of a user interface, according to various embodiments of the present disclosure.

FIG. 12 is a diagram of an example of a user interface, according to various embodiments of the present disclosure.

Referring to screenshots 1201 and 1203, contents or information may be displayed in proportion to the exposed area of the secondary display 430. Further, such contents or information may be added or removed in proportion to the exposed area of the secondary display 430. The added or removed contents or information may have a correlation. This correlation may mean the same kind of information. For example, a time of day, a day of the week, and a date, related to time in common, may have a correlation of the same kind.

If R2 is greater than R1, the secondary display 430 may display much more contents or information in the example of the exposed area R2 than in the example of the exposed area R1.

For example, when the exposed area of the secondary display 430 is R1, the secondary display 430 may display only a time of day among information about time. Also, when the exposed area of the secondary display 430 is R2, the secondary display 430 may display a day of the week and a date as well as a time of day.

In this regard, if the size of the exposed area of the secondary display 430 is changed while the electronic device 200 performs an operation of displaying information as shown in screenshot 1201 or 1203, the electronic device 200 may update such information to be displayed on the secondary display 430.

For example, if the exposed area of the secondary display 430 is expanded as shown in screenshot 1203 while information is partially displayed on the secondary display 430 as shown in screenshot 1201, the secondary display 430 may further display additional information.

On the contrary, if the exposed area of the secondary display 430 is contracted as shown in screenshot 1201 while the whole information is displayed on the secondary display 430 as shown in screenshot 1203, the secondary display 430 may remove part of displayed information.

Figure 13:
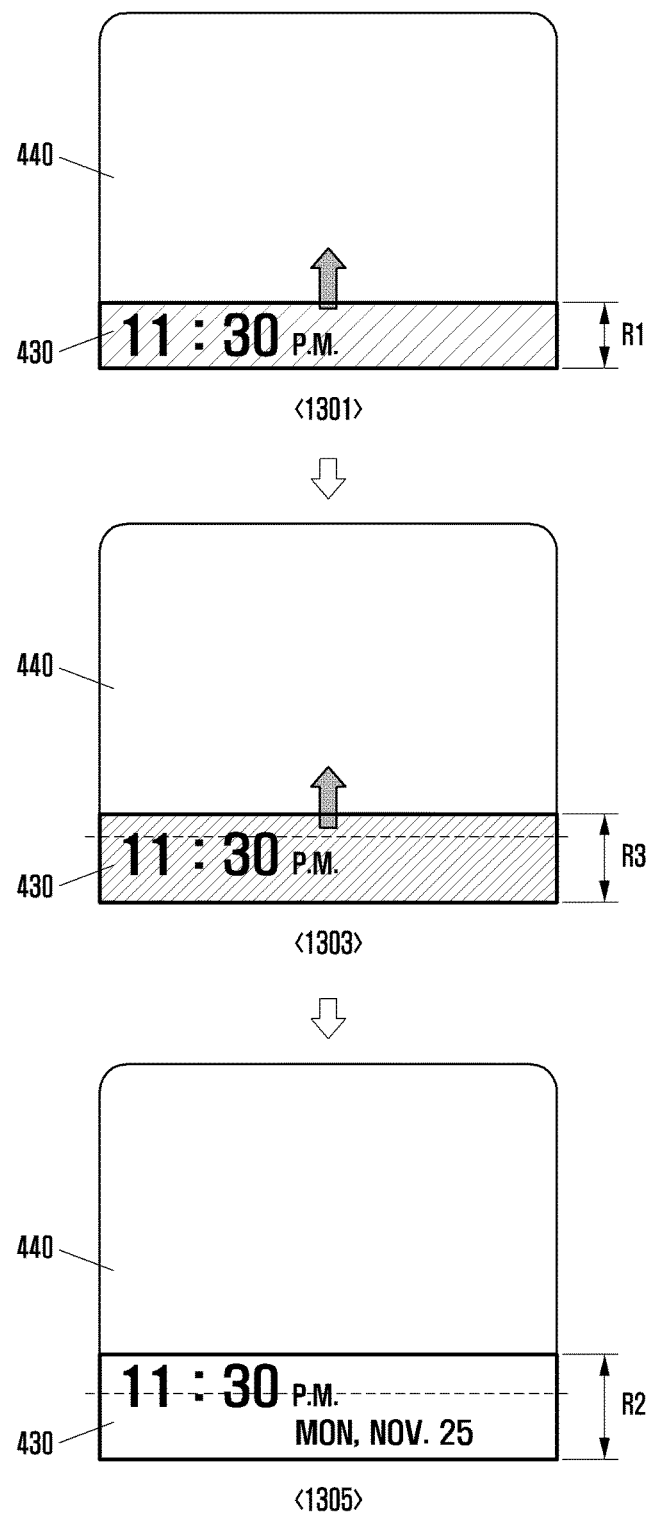
FIG. 13 is a diagram of an example of a user interface, according to various embodiments of the present disclosure.

FIG. 13 is a diagram of an example of a user interface, according to various embodiments of the present disclosure.

Referring to screenshots 1301, 1303 and 1305, the brightness of the secondary display 430 may be varied depending on the size of the exposed area of the secondary display 430.

For example, assume that the secondary display 430 is exposed by the exposed areas R1, R2, or R3. In this example, R3 is greater than R1 and smaller than R2.

The brightness of the secondary display 430 may become bright or dark, being directly proportional to the size of the exposed area of the secondary display 430. As illustrated, the larger the exposed area of the secondary display 430, the greater the brightness of the secondary display is set to be.

Figure 14:
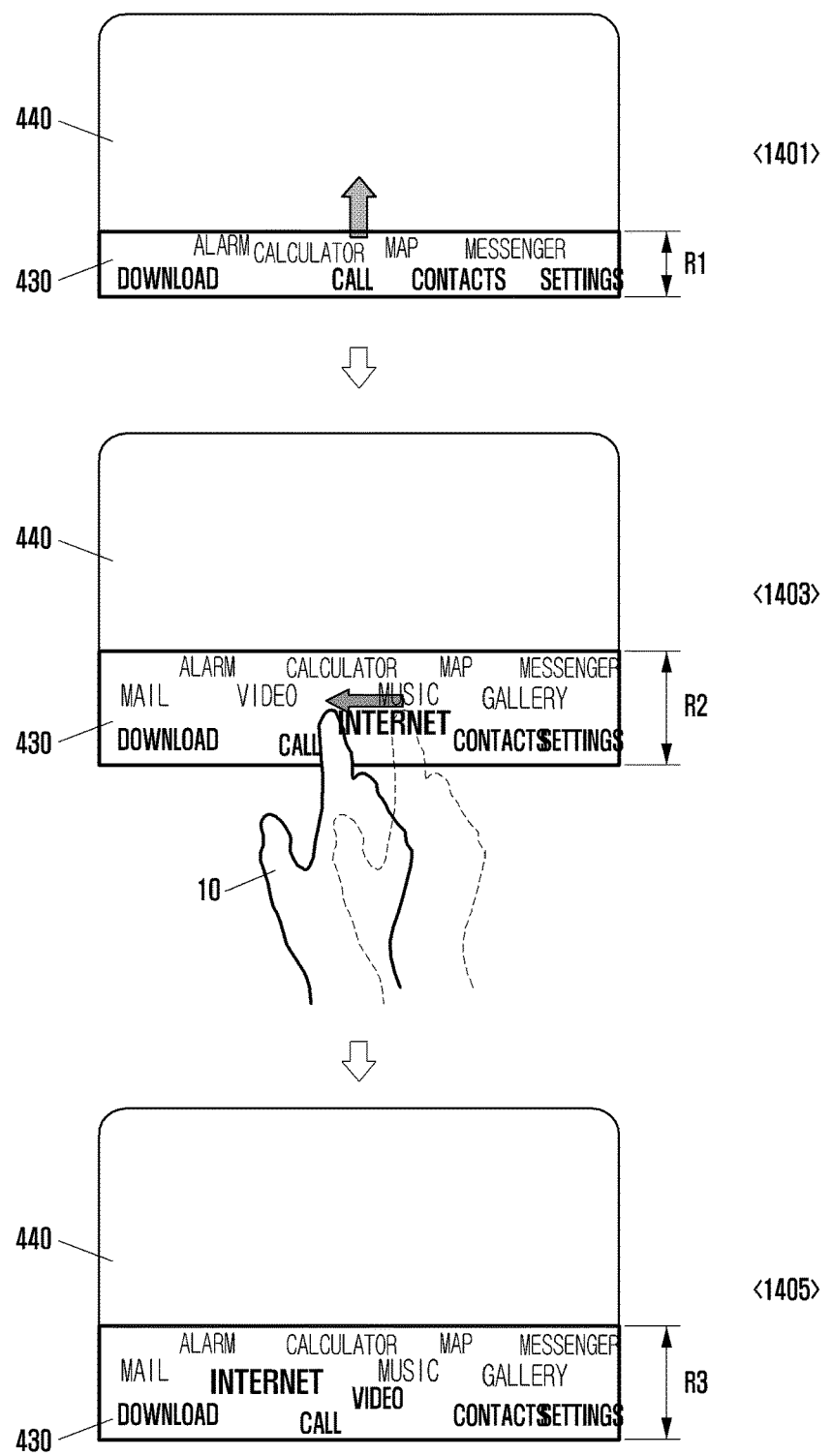
FIG. 14 is a diagram of an example of a user interface, according to various embodiments of the present disclosure.

FIG. 14 is a diagram of an example of a user interface, according to various embodiments of the present disclosure.

Referring to screenshots 1401 and 1403, the amount of contents or information being displayed may be increased or decreased in proportion to the size of the exposed area of the secondary display 430.

In this example, contents or information displayed increasingly or decreasingly may have no correlation. Namely, different kinds of contents or information may be displayed. For example, such contents or information may be icons or text articles which are linked to executable functions, respectively.

If R2 is greater than R1, the secondary display 430 may display the greater amount of contents or information in the example of the exposed area R2 than in the example of the exposed area R1.

For example, when the exposed area of the secondary display 430 is R1 as shown in screenshot 1401, some text articles linked to executable functions of the electronic device 200 may be displayed such as 'download', 'call', 'contacts', 'settings', 'alarm', 'calculator', 'map', and 'messenger'.

By contrast, when the exposed area of the secondary display is R2 as shown in screenshot 1403, additional text articles linked to other executable functions such as 'mail', 'video', Internet', 'music', and 'gallery' may be further displayed.

Meanwhile, if a user input is entered with regard to a selected one of displayed text articles as shown in screenshot 1403, the electronic device 200 may perform a particular function corresponding to the selected article.

In various embodiments, a user input may be a drag-and-drop for a selected one of displayed articles as shown in screenshot 1403, and the electronic device 200 may move a display position of the selected article as shown in screenshot 1405.

For example, as shown in screenshot 1405, the electronic device 200 may move leftwards the selected article, Internet', displayed on the secondary display 430 in response to a user input.

Figure 15A:
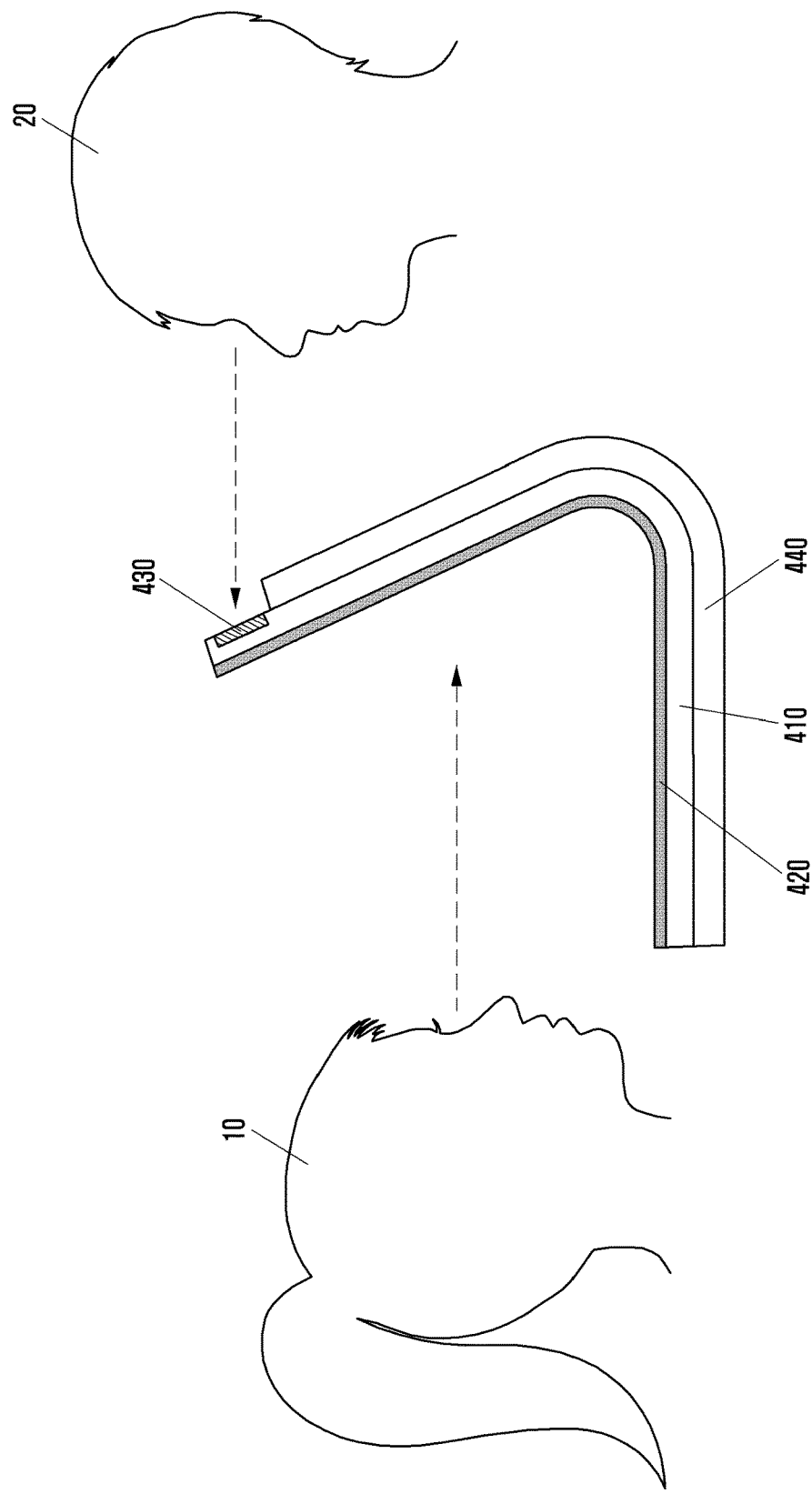
FIG. 15A is a diagram illustrating an aspect of the operation of an electronic device, according to various embodiments of the present disclosure.
Figure 15B:
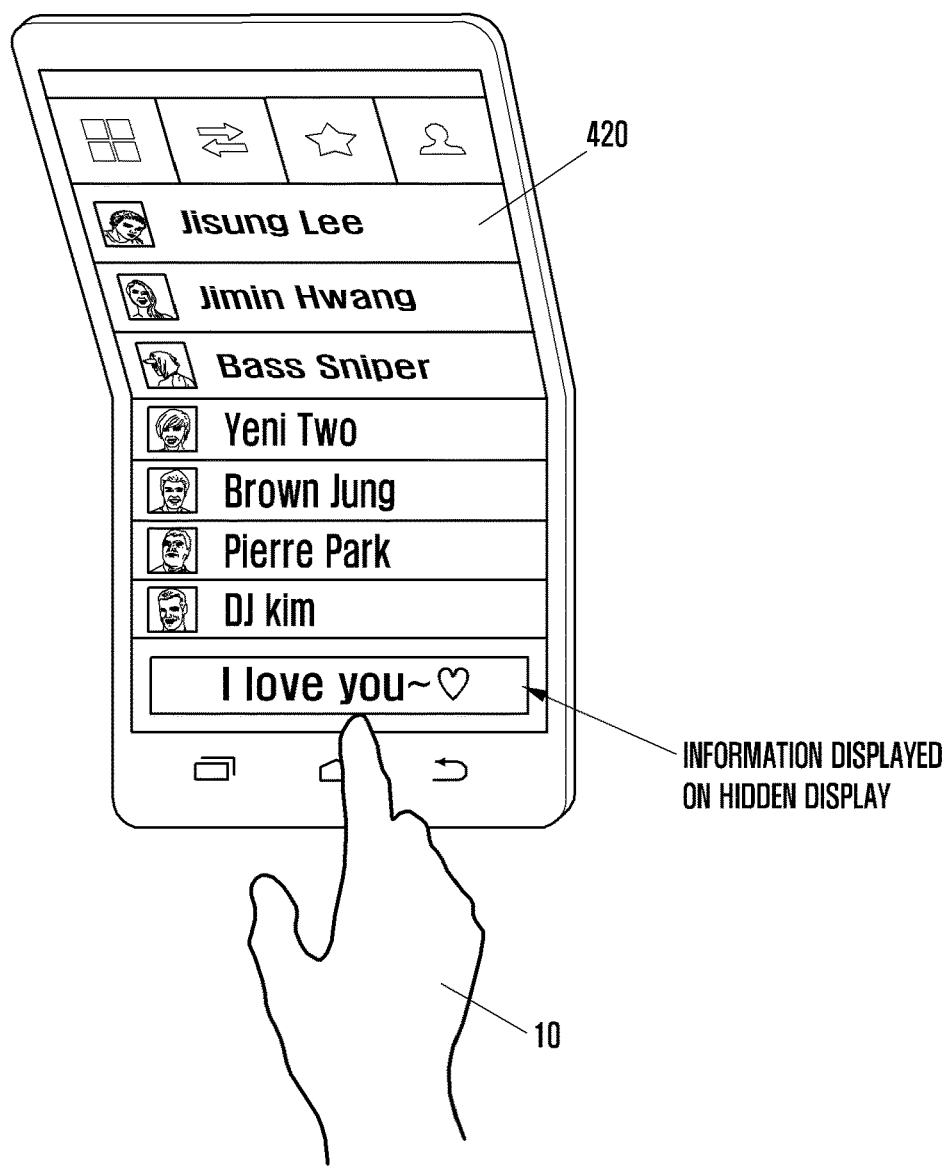
FIG. 15B is a diagram illustrating an aspect of the operation of an electronic device, according to various embodiments of the present disclosure.

FIGS. 15A and 15B are diagrams illustrating aspects of the operation of an electronic device, according to various embodiments of the present disclosure.

Referring to FIG. 15A, the first user 10 may view the main display 420, and the second user 20 may view the secondary display 430.

Referring to FIG. 15B, the electronic device 200 may also display information, displayed on the secondary display 430, on a part of the main display 420.

Therefore, the first user 10 as shown in FIG. 15A can view information that is also displayed on the secondary display 430, through the main display 420 as shown in FIG. 15B.

Figure 16:
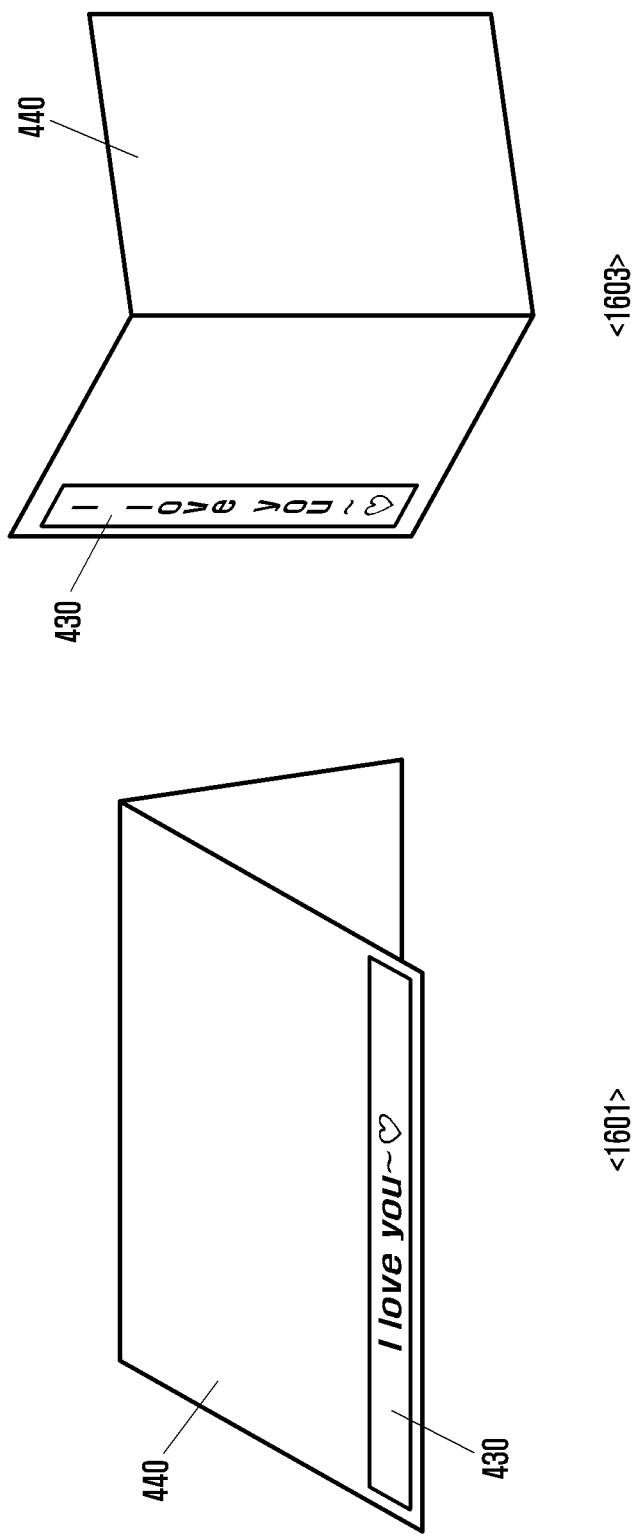
FIG. 16 is a diagram illustrating an aspect of the operation of an electronic device, according to various embodiments of the present disclosure.

FIG. 16 is a diagram illustrating an aspect of the operation of an electronic device, according to various embodiments of the present disclosure.

As illustrated, the electronic device 200 may change a mode of information displayed on the secondary display 430, depending on the orientation of the electronic device 100.

For example, when the electronic device 200 is placed in a portrait orientation, information may be displayed on the secondary display 430 in a portrait mode (reference numeral 1603). Similarly, when the electronic device 200 is placed in a landscape orientation (reference numeral 1601), information may be displayed on the secondary display 430 in a landscape mode.

Figure 17:
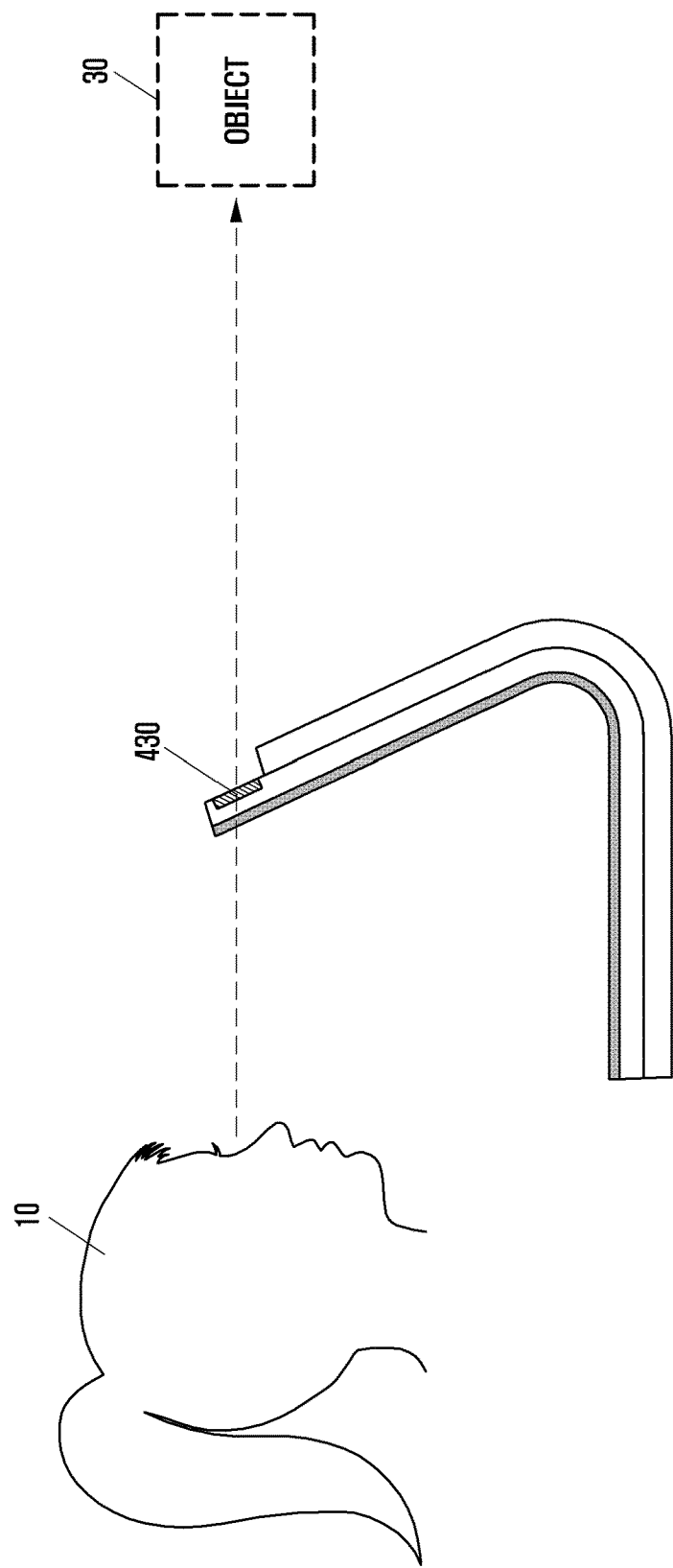
FIG. 17 is a diagram illustrating an aspect of the operation of an electronic device, according to various embodiments of the present disclosure.

FIG. 17 is a diagram illustrating an aspect of the operation of an electronic device, according to various embodiments of the present disclosure.

As illustrated, if the secondary display 430 is formed as a transparent display, the user 10 may perceive an object 30 through the secondary display 430. In this example, both the main body 410 and the main display 420 may be also formed as a transparent material at a position where the secondary display 430 is formed.

Figure 18:
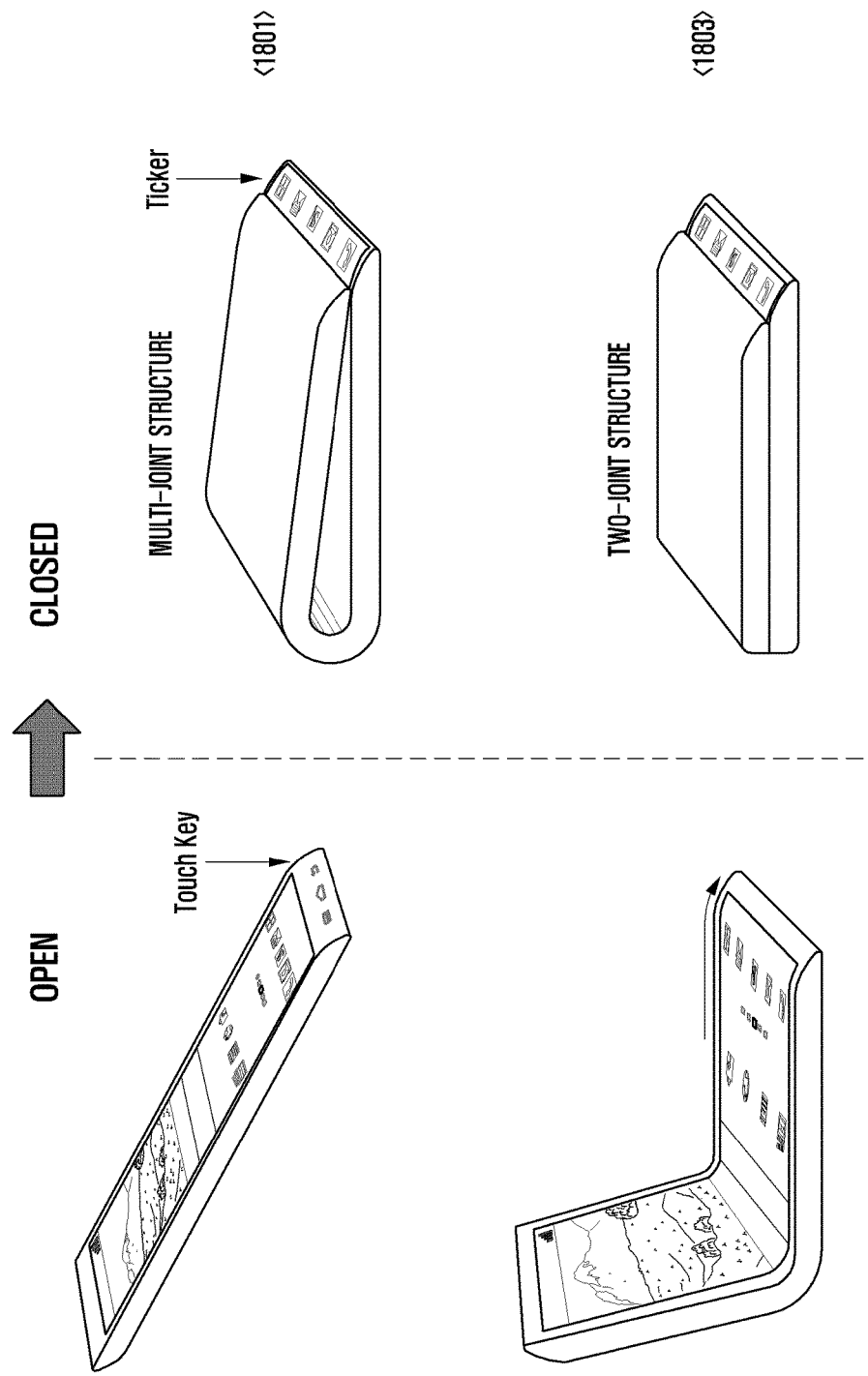
FIG. 18 is a diagram illustrating an aspect of the operation of an electronic device, according to various embodiments of the present disclosure.

FIG. 18 is a diagram illustrating an example of an electronic device being folded asymmetrically without a cover, according to various embodiments of the present disclosure.

As indicated by a reference numeral 1801, the electronic device 200 may have a multi-joint structure in which the main display 420 is foldable asymmetrically without a cover. Additionally, as indicated by a reference numeral 1803, the electronic device 200 may have a two-joint structure in which the main display 420 is foldable asymmetrically without a cover.

When the main display 420 is folded asymmetrically without a cover, the electronic device 200 may have, at a part thereof, a receptible space capable of receiving a loop that is formed at the location where the main display 420 is folded.

When the electronic device 200 is folded, the electronic device 200 may use, in the manner discussed with respect to the secondary display, the main display 420 contained in the receptible space.

Figure 19:
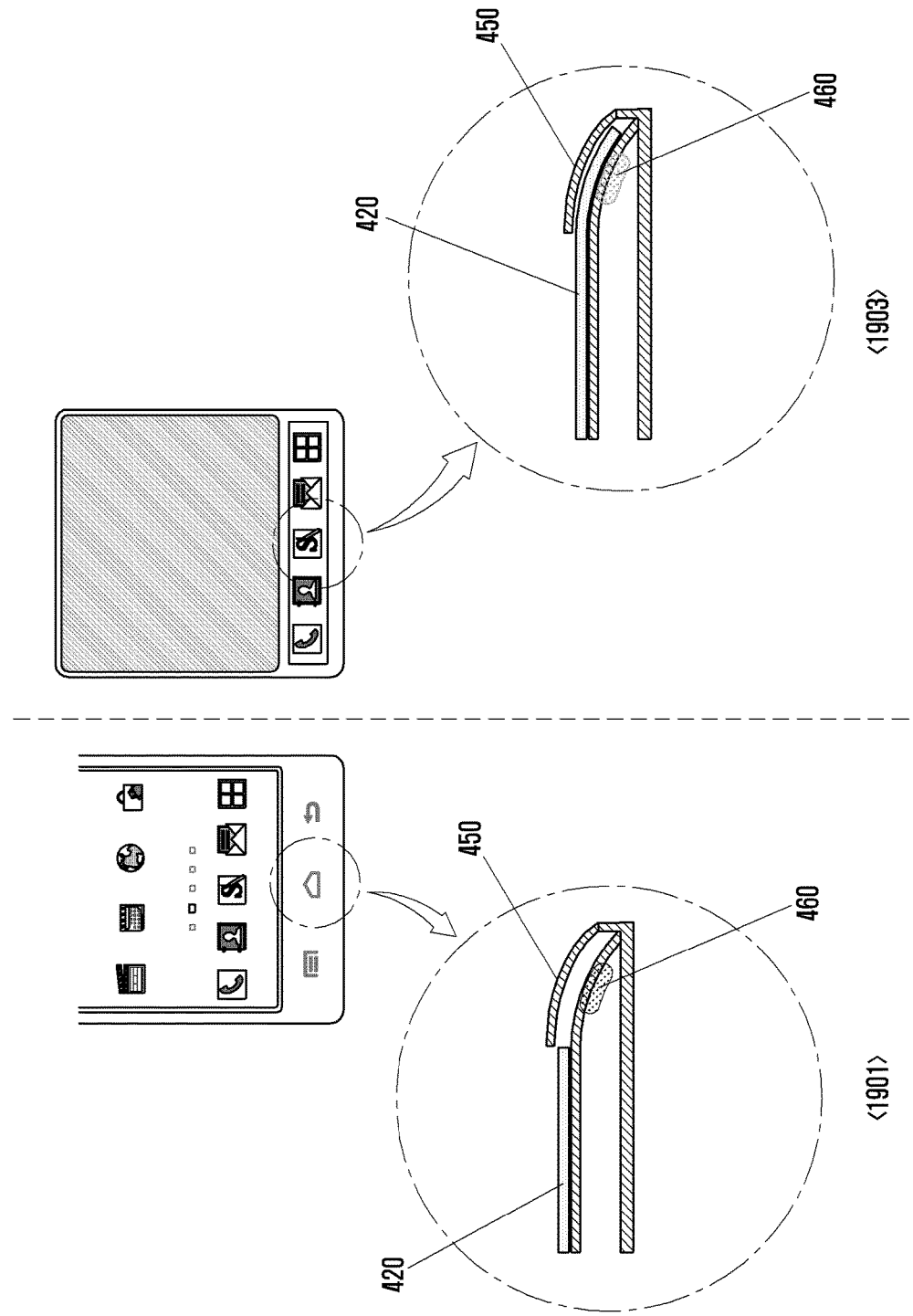
FIG. 19 is a diagram illustrating an aspect of the operation of an electronic device, according to various embodiments of the present disclosure.

FIG. 19 is a diagram illustrating an example of an electronic device being folded asymmetrically without a cover, according to various embodiments of the present disclosure.

A reference numeral 1901 shows an example in which the electronic device 200 is unfolded. The main body 410 of the electronic device 200 may include a receptible part 450 and a light emitting part 460. When the electronic device 200 is unfolded, the main display 420 may be placed out of the receptible part 450 and thereby exposed to the outside, and the light emitting part 460 may be turned off. The receptible part 450 may be formed of a transparent material. The main display 420 may be formed as a transparent display partially, i.e., at a portion to be contained in the receptible part 450, or wholly.

A reference numeral 1903 shows an example where the electronic device 200 is folded. In this example, the main display 420 may be partially contained in the receptible part 450, and the light emitting part 460 may be turned on. A portion of the main display 420 contained in the receptible part 450 may be used as the secondary display.

Figure 20:
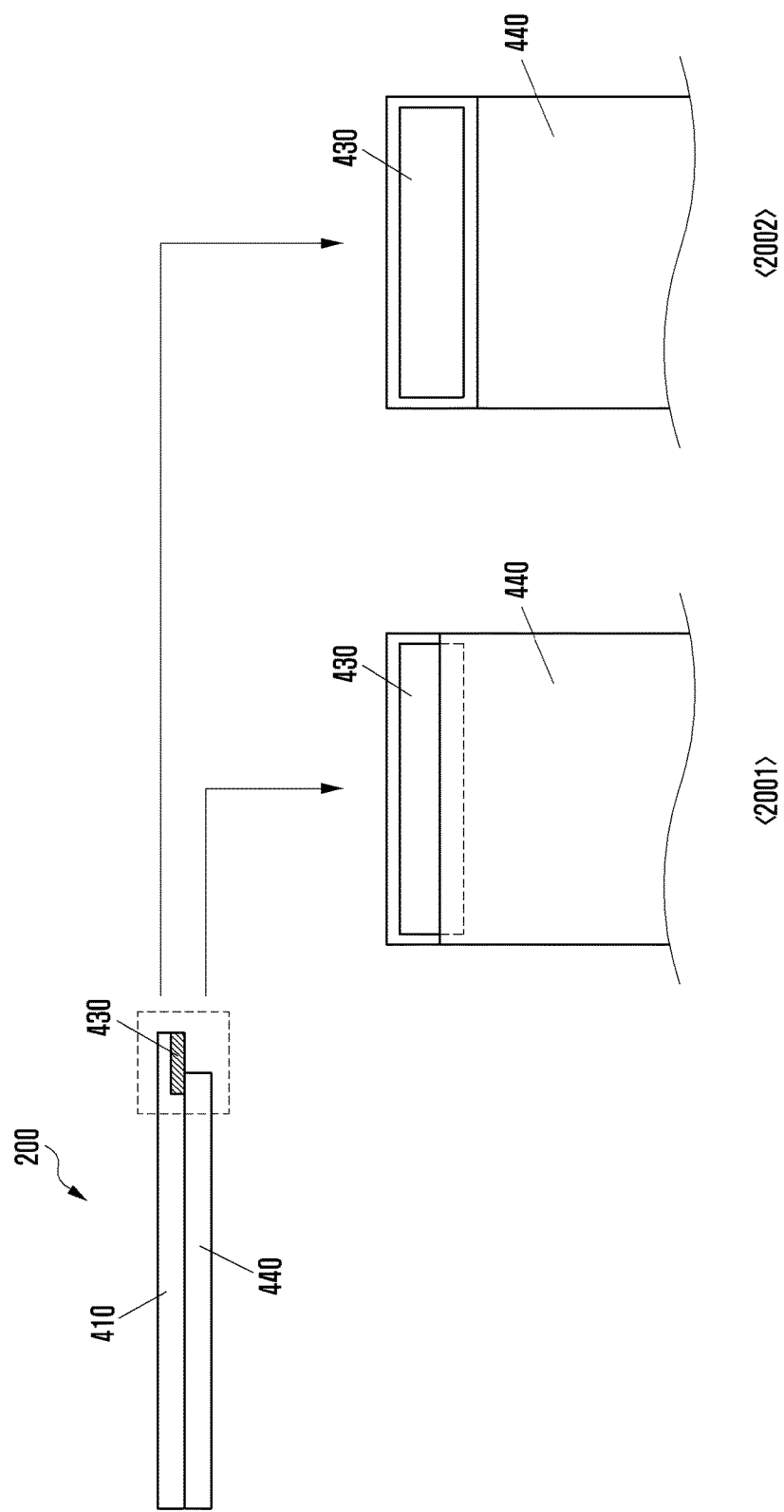
FIG. 20 is a diagram of an example of an electronic device having a hidden display, according to various embodiments of the present disclosure.

FIG. 20 is a diagram illustrating an example of an electronic device having a secondary display, according to various embodiments of the present disclosure.

More particularly, FIG. 20 shows one lateral side of the electronic device 200 having the secondary display 430 and being in an unfolded state. A reference numeral 2001 indicates, in a plan view, the secondary display 430 when the electronic device 200 is unfolded, and a reference numeral 2002 indicates, in a plan view, the secondary display 430 when the electronic device 200 is folded.

As indicated by the reference numeral 2001, when the electronic device 200 having the secondary display 430 is unfolded, the cover 440 may cover at least a portion of the secondary display 430 formed on the main body 410. Therefore, the secondary display 430 may be exposed partially, and the electronic device 200 may display information through the partially exposed secondary display 430.

As indicated by the reference numeral 2002, when the electronic device 200 having the secondary display 430 is folded on the central part of the main body 410, the cover 440 may be placed out of the secondary display 430 formed on the main body 410. Therefore, the secondary display 430 may be exposed completely to the outside.

Figure 21:
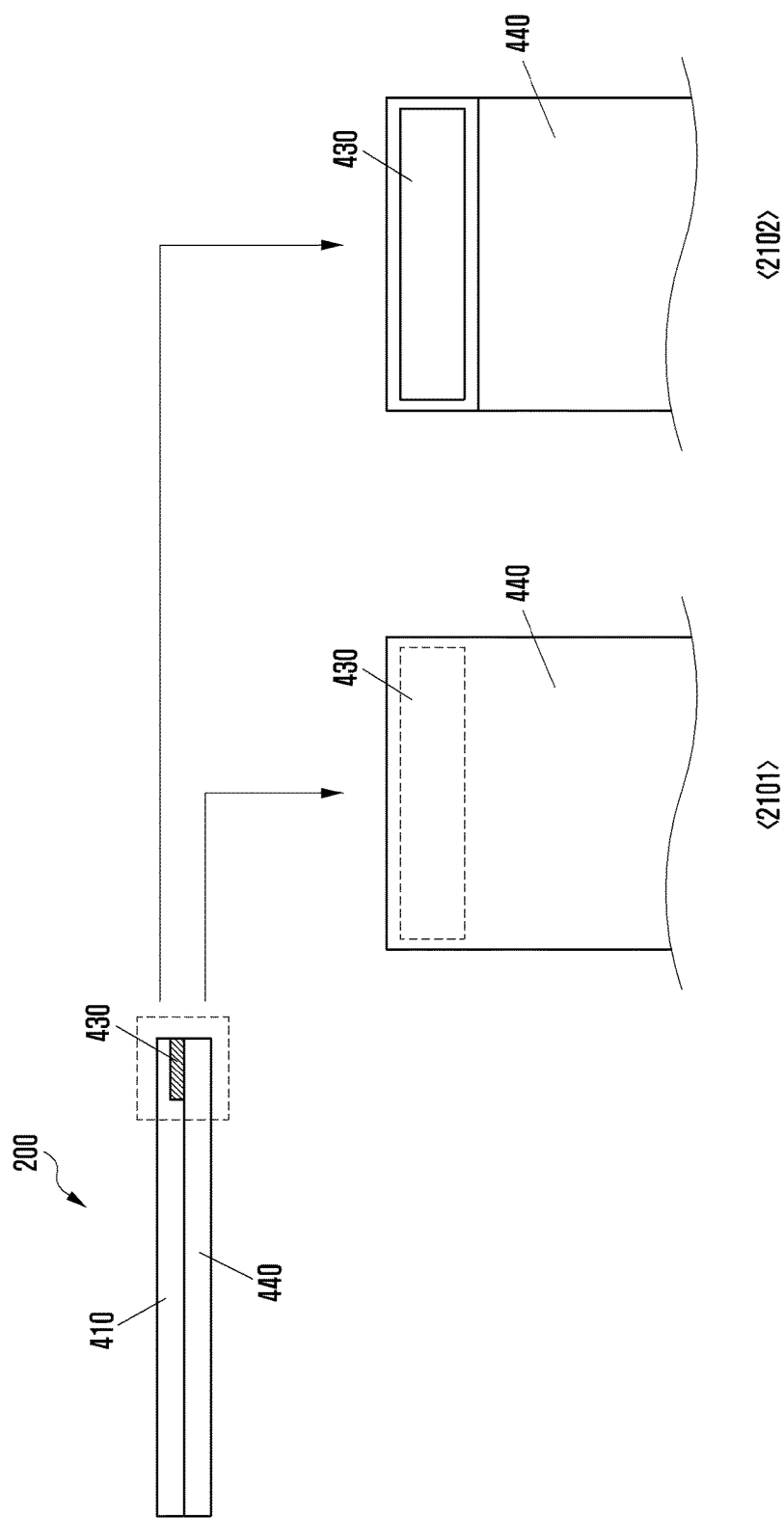
FIG. 21 is a diagram of an example of an electronic device having a hidden display, according to various embodiments of the present disclosure.

FIG. 21 is a diagram of an example of an electronic device having a secondary display, according to various embodiments of the present disclosure. More particularly, FIG. 21 shows one lateral side of the electronic device 200 having the secondary display 430 and being in an unfolded state. A reference numeral 2101 indicates, in a plan view, the secondary display 430 when the electronic device 200 is unfolded, and a reference numeral 2102 indicates, in a plan view, the secondary display 430 when the electronic device 200 is folded.

As indicated by the reference numeral 2101, when the electronic device 200 having the secondary display 430 is unfolded, the cover 440 may cover completely the secondary display 430. Therefore, the electronic device 200 may protect the secondary display 430 through the cover 440 without exposing the secondary display 430 to the outside.

As indicated by the reference numeral 2102, when the electronic device 200 having the secondary display 430 is folded on the central part of the main body 410, the cover 440 may be placed out of the secondary display 430 formed on the main body 410. Therefore, the secondary display 430 may be exposed completely to the outside.

Figure 22:
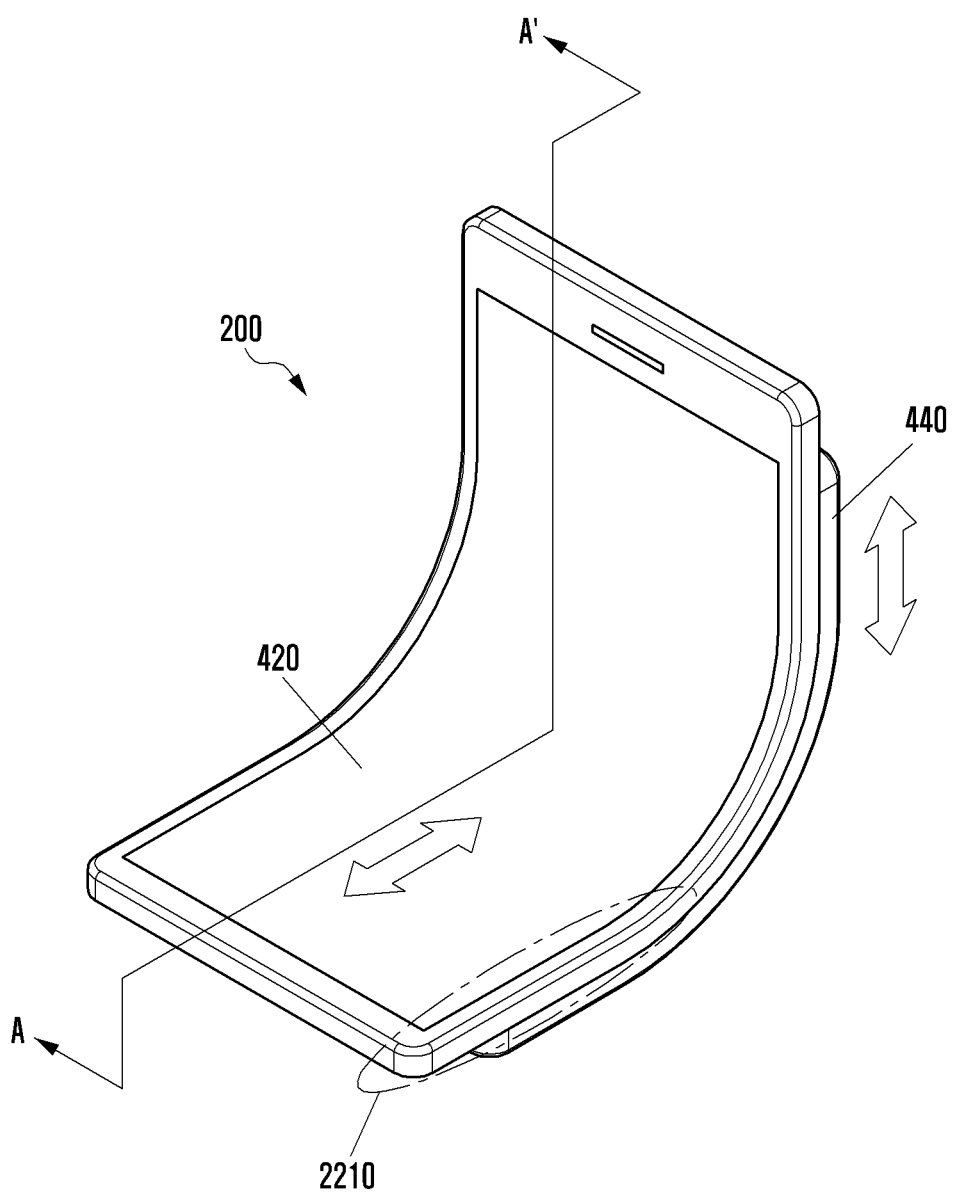
FIG. 22 is a diagram of an example of an electronic device having a hidden display, according to various embodiments of the present disclosure.
Figure 23:
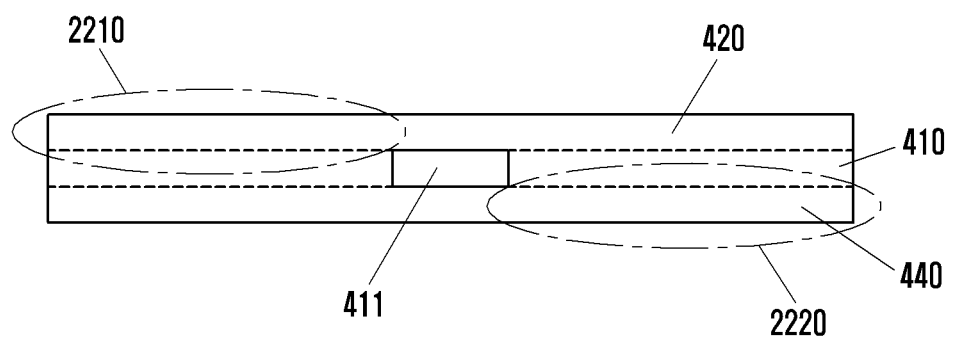
FIG. 23 is a cross-sectional view of the electronic device of FIG. 22 that is taken along the line A-A', according to various embodiments of the present disclosure.

FIG. 22 is a diagram of an example of an electronic device having a secondary display, according to various embodiments of the present disclosure. FIG. 23 is a cross-sectional view of the electronic device of FIG. 22 that is taken along the line A-A', according to various embodiments of the present disclosure.

Referring to FIGS. 22 and 23, the main display 420 or the cover 440 may be moved when the electronic device 200 is folded or unfolded. Further, the electronic device 200 may include a rail structure that prevents the main display 420 or the cover 440, when moved, from being separated to the outside.

This rail structure of the electronic device 200 is formed on the main body 410. Additionally, the rail structure may include a structure for supporting the main display 420 so as to protect the main display 420 from a vertical pressure and a structure for protecting edges of the main display 420 being moved.

The main display 420 or the cover 440 may be divided into two regions by the hinge part 411. The first region of the main display 420 may be an upper region of the main display 420, and the second region of the main display 420 may be a lower region of the main display 420.

Similarly, the first region of the cover 440 may be an upper region of the cover 411, and the second region of the cover 440 may be a lower region of the cover 440.

In one example where the main display 420 or the cover 440 is divided into two regions by the hinge part 411, one region may be movable when the electronic device 200 is folded or unfolded, and the other region may be fixed without any movement.

For example, the upper region of the main display 420 may be fixed, and the lower region of the main display 420 may be movable. In this example, a rail 2210 of the electronic device 420 may be disposed in the lower region of the main display 420.

Alternatively, the lower region of the cover 440 may be fixed, and the upper region of the cover 440 may be movable. In this example, a rail 2220 of the electronic device 420 may be disposed in the upper region of the cover 440.

The fixed regions of the main display 420 and the cover 440 may have a cross arrangement in the electronic device 200. Similarly, the movable regions of the main display 420 and the cover 440 may have a cross arrangement in the electronic device 200.

For example, if the upper region of the main display 420 is fixed, the lower region of the cover 440 may be fixed. When the upper region of the main display 420 is fixed, the lower region of the main display 420 may be movable. Also, when the lower region of the cover 440 is fixed, the upper region of the cover 440 may be movable.

Similarly, if the lower region of the main display 420 is fixed, the upper region of the cover 440 may be fixed. When the lower region of the main display 420 is fixed, the upper region of the main display 420 may be movable. Also, when the upper region of the cover 440 is fixed, the lower region of the cover 440 may be movable.

The rail structures 2210 and 2220 that allow the main display 420 or the cover 440 to be moved when the electronic device 200 is folded or unfolded may be located partly in the upper region from the hinge part 411 and located partly on the lower region. Additionally, at least one of such rail structures 2210 and 2220 may be located near the main display 420, and at least one thereof may be located near the cover 440.

Figure 24:
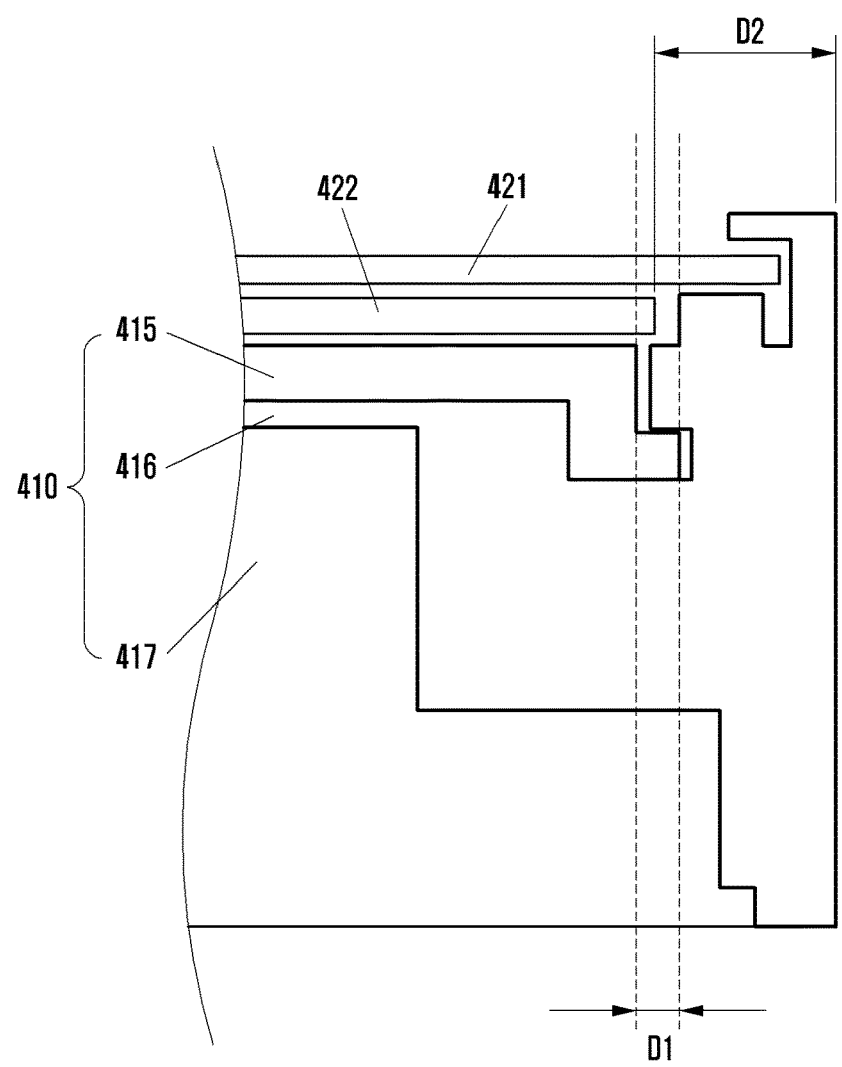
FIG. 24 is a diagram illustrating an example of a rail structure of the electronic device of FIG. 22, according to various embodiments of the present disclosure.

FIG. 24 is a diagram illustrating an example of a rail structure of the electronic device of FIG. 22, according to various embodiments of the present disclosure. In addition, FIG. 25 is a diagram illustrating another example of a rail structure of the electronic device of FIG. 22, according to various embodiments of the present disclosure.

Figure 25:
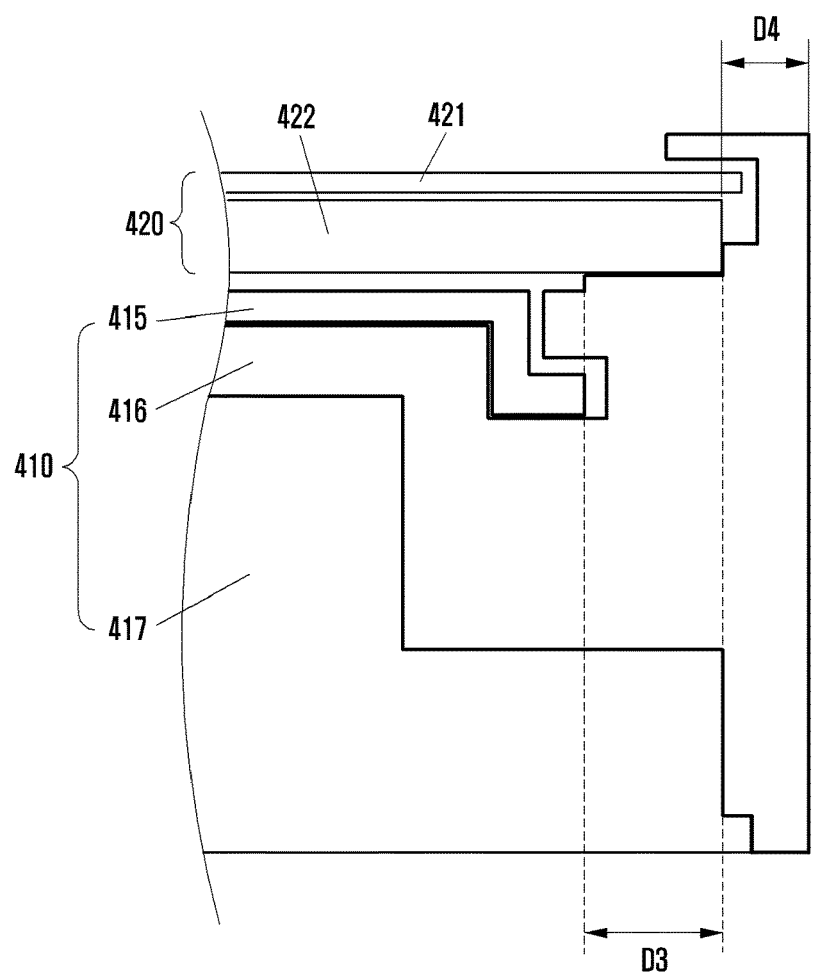
FIG. 25 is a diagram illustrating an example of a rail structure of the electronic device of FIG. 22, according to various embodiments of the present disclosure.

Referring to FIGS. 24 and 25, the rail structure 2210 of the electronic device 200 may prevent the main display 420, when moved, from being separated from the electronic device 200.

The main display 420 may be composed of a window 421 and a display 422. The main body 410 may include the first rail 415 having a structure for supporting the main display 420 so as to protect the main display 420 from a vertical pressure, the second rail 416 having a structure for protecting edges of the main display 420 being moved, and an internal structure 417 thereof.

The first rail 415 may support the display 422 and have an L-shaped structure at the end thereof near the edge of the electronic device 200. The second rail 416 may have a rail groove or guide structure for accommodating the L-shaped end of the first rail 415 at a portion thereof, and also have a 180-degree rotated L-shaped (i.e., reverse L-shaped) structure at the end thereof so as to protect the edge of the main display 420 being moved. Namely, the first rail 415 can be moved along the rail groove or guide structure of the second rail 416, and the main display 420 can be moved while being inserted into the reverse L-shaped end of the second rail 416.

As shown in FIG. 24, the first rail 415 may support the whole display 422 and be laterally extended out of the display 422 by the first distance (D1). In this example, a black matrix (BM) region may be formed within the second distance (D2).

As shown in FIG. 25, the first rail 415 may support at least part of the display 422. In this example, the display 421 may be laterally extended out of the first rail 415 by the third distance (D3). The BM region may be formed within the fourth distance (D4). The second distance (D2) may be greater than the fourth distance (D4).

Figure 26:
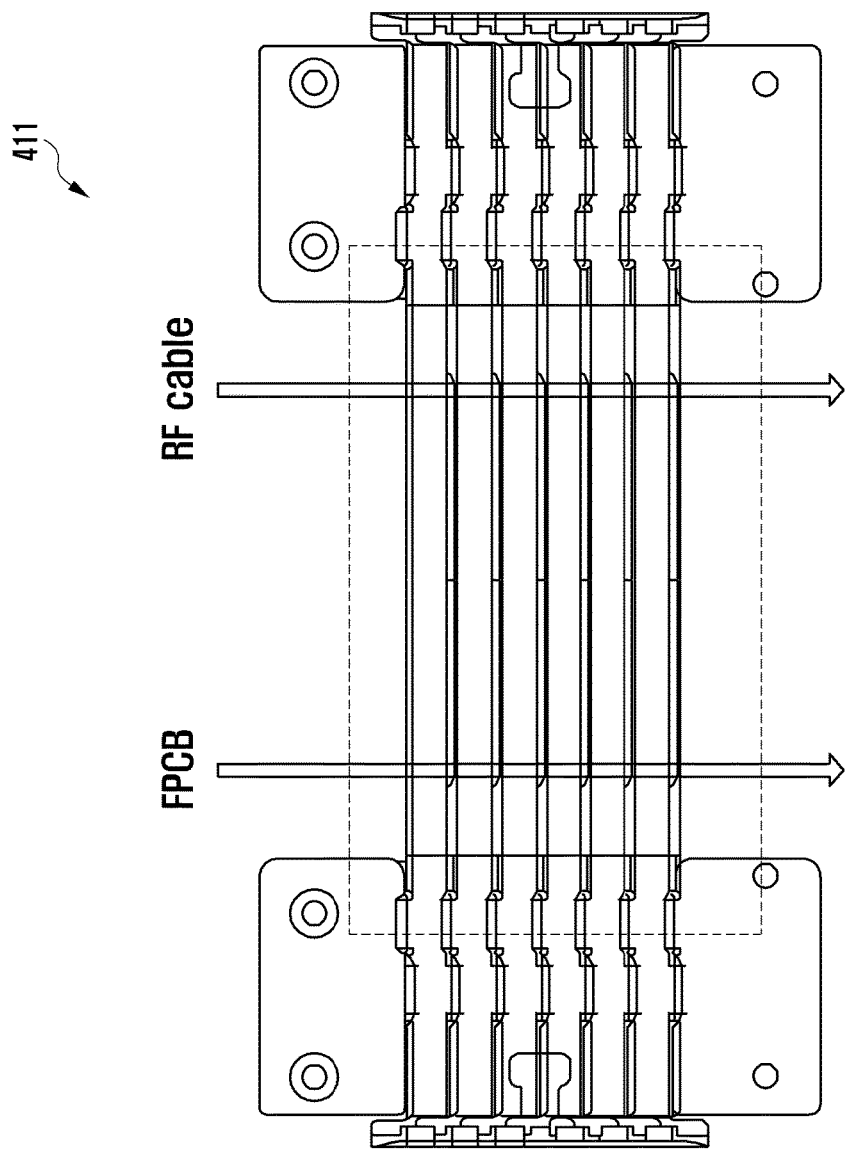
FIG. 26 is a diagram illustrating an example of a hinge part of an electronic device, according to various embodiments of the present disclosure.

FIG. 26 is a diagram illustrating an example of a hinge part of an electronic device, according to various embodiments of the present disclosure.

As illustrated, the hinge part 411 may be formed of a flexible printed circuit board (FPCB) capable of being foldable, and may include a radio frequency (RF) cable or the like on the FPCB.

Figure 27:
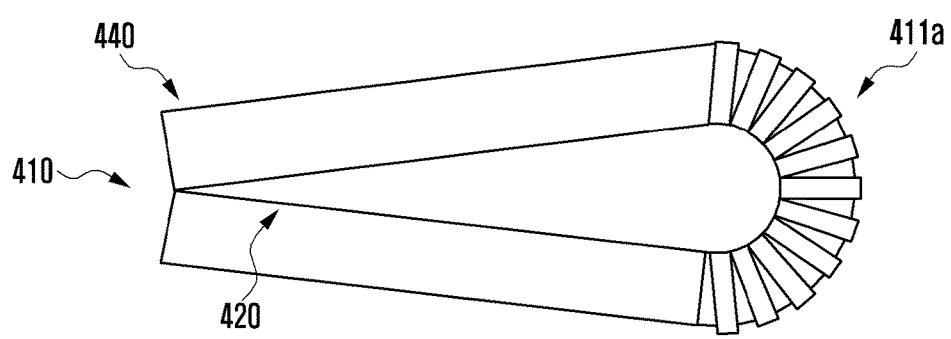
FIG. 27 is a diagram of an example of an electronic device, according to various embodiments of the present disclosure.

FIG. 27 is a diagram of an example of an electronic device, according to various embodiments of the present disclosure.

As illustrated, the electronic device 200 may include the main body 410. Also, the main body 410 may include the main display 420, the cover 440, and the hinge part 411a.

At least one secondary display may be formed at the upper region and/or the lower end of the main body 410. The secondary display may display information depending on a structural variation of the electronic device 200 (e.g., when the electronic device 200 is folded or bent).

Referring to FIG. 27, the main display 420 may be fixed to at least a portion of the main body 410. Namely, although any structural variation (e.g., even though the electronic device 200 is folded or bent) occurs at the electronic device 200, the main display 420 may be fixed to at least a portion of the main body 410 without being moved. The hinge part 411a may have a multi-axis structure. For example, the hinge part 411a may have a bellows shape as shown. The electronic device 200 having the bellows-shaped hinge part 411a may undergo a structural variation such as folding when the hinge part 411a receives a bending momentum or force. In this example, the inside of the hinge part 411a may undergo a bending stress. Specifically, when the hinge part 411a is bent or folded, the inner portion of the bent or folded point may undergo a compression stress, and the outer portion of the bent or folded point may undergo a tension stress. Therefore, when folded or bent, the electronic device 200 having the bellows-shaped hinge part 411a may rotate on the inner portion of the bent or folded point that undergoes a compression stress. Namely, in this example, the hinge part 411a may rotate on an inner point of the neutral axis where a bending momentum is applied.

When the electronic device 200 is transformed structurally on the basis of the hinge part 411a, the cover 440 disposed at a portion of the main body 410 may slide.

According to various embodiments, when the electronic device 200 is transformed structurally on the basis of the hinge part 411a, the upper half of the cover 440 and the lower half of the cover 440, divided by the hinge part 411a disposed at the center of the main body 410, may slide at the same time.

According to various embodiments, when an electronic device 200 is transformed structurally on the basis of the hinge part 411a, one of the upper and lower halves of the cover 440, divided by the hinge part 411a disposed at the center of the main body 410, may slide whereas the other may be fixed.

Figure 28:
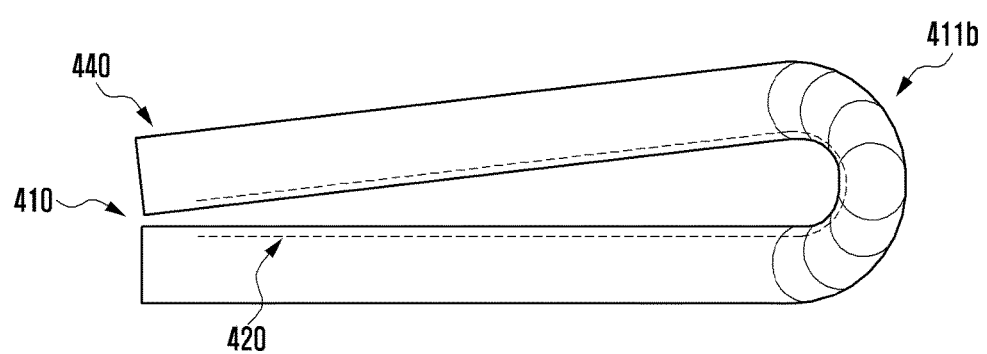
FIG. 28 is a diagram of an example of an electronic device, according to various embodiments of the present disclosure.

FIG. 28 is a diagram of an example of an electronic device, according to various embodiments of the present disclosure.

As illustrated, the electronic device 200 may include the main body 410. Also, the main body 410 may include the main display 420, the cover 440, and the hinge part 411b.

At least one secondary display may be formed at the upper region and/or the lower end of the main body 410. The secondary display may display information depending on a structural variation of the electronic device 200 (e.g., when the electronic device 200 is folded or bent).

Referring to FIG. 28, the main display 420 may be fixed to at least a portion of the main body 410. According to various embodiments, the main display 420 may be moved (e.g., sliding) when the electronic device 200 is transformed structurally.

The hinge part 411b may have a multi-axis structure. In other words, the hinge part 411b may have a multi-joint structure. For example, the multi-joint structure of the hinge part 411b may be based on one or more ball joints. When folded or bent, the electronic device 200 having the hinge part 411b of a multi-joint structure may rotate on the neutral axis of the hinge part 411b where a bending momentum is applied.

When the electronic device 200 is transformed structurally on the basis of the hinge part 411b, the cover 440 disposed at a portion of the main body 410 may slide.

According to various embodiments, when the electronic device 200 is transformed structurally on the basis of the hinge part 411b, the upper half of the cover 440 and the lower half of the cover 440, divided by the hinge part 411b disposed at the center of the main body 410, may slide at the same time.

According to various embodiments, when an electronic device 200 is transformed structurally on the basis of the hinge part 411b, one of the upper and lower halves of the cover 440, divided by the hinge part 411b disposed at the center of the main body 410, may slide whereas the other may be fixed.

Figure 29:
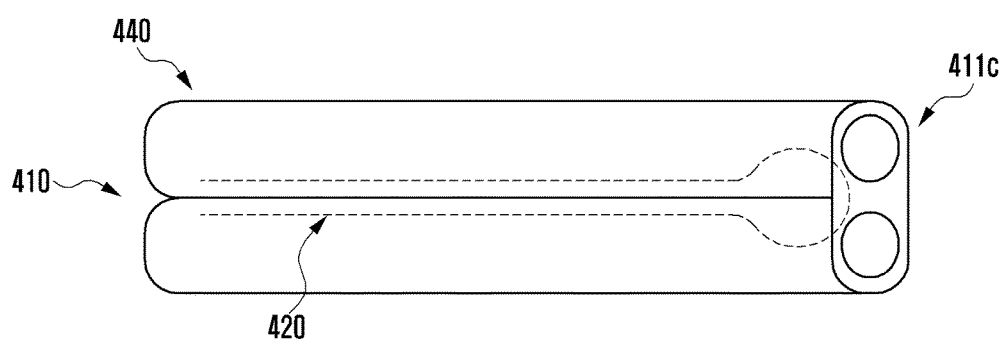
FIG. 29 is a diagram of an example of an electronic device, according to various embodiments of the present disclosure.

FIG. 29 is a diagram of an example of an electronic device, according to various embodiments of the present disclosure.

As illustrated, the electronic device 200 may include the main body 410. Also, the main body 410 may include the main display 420, the cover 440, and the hinge part 411c.

At least one secondary display may be formed at the upper region and/or the lower end of the main body 410. The secondary display may display information depending on a structural variation of the electronic device 200 (e.g., when the electronic device 200 is folded or bent).

Referring to FIG. 29, the main display 420 may be fixed to at least a portion of the main body 410. According to various embodiments, the main display 420 may be moved (e.g., sliding) when the electronic device 200 is transformed structurally.

The hinge part 411c may have a two-axis structure. When folded or bent, the electronic device 200 having the hinge part 411c of a two-axis structure may rotate on the neutral axis (e.g., the center) of the hinge part 411c where a bending momentum is applied.

When the electronic device 200 having the hinge part 411c of a two-axis structure is folded or bent, the main body 410 may be completely folded and thereby both halves of the main display 420 may come in contact with each other. Further, in order to prevent the main display 420 from being separated from the main body 410, the electronic device 200 having the hinge part 411c of a two-axis structure may have a space for partially accommodating the main display 420 near the hinge part 411c.

When the electronic device 200 is transformed structurally on the basis of the hinge part 411c, the cover 440 disposed at a portion of the main body 410 may slide.

According to various embodiments, when the electronic device 200 is transformed structurally on the basis of the hinge part 411c, the upper half of the cover 440 and the lower half of the cover 440, divided by the hinge part 411c disposed at the center of the main body 410, may slide at the same time.

According to various embodiments, when an electronic device 200 is transformed structurally on the basis of the hinge part 411c, one of the upper and lower halves of the cover 440, divided by the hinge part 411c disposed at the center of the main body 410, may slide whereas the other may be fixed.

The apparatuses and methods of the disclosure can be implemented in hardware, and in part as firmware or as software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor", "controller", or "control unit" constitute hardware in the claimed disclosure that contain circuitry that is configured for operation. Under the broadest reasonable interpretation, the appended claims constitute statutory subject matter in compliance with 35 U.S.C. § 101.

The definition of the terms "unit" or "module" as referred to herein are to be understood as constituting hardware circuitry such as a CCD, CMOS, a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

While the present disclosure has been particularly shown and described with reference to an exemplary embodiment thereof, it will be understood by those skilled in the art that various changes in form and details may be made therein without departing from the spirit and scope of the disclosure as defined by the appended claims.

What is claimed is:

1. A method for displaying information in a foldable electronic device having a flexible primary display and a secondary display that is exposed when the foldable electronic device is folded, the method comprising:
    calculating, by a processor, a folding angle of the flexible primary display;
    calculating a size of an exposed area of the secondary display based on the folding angle, wherein the exposed area of the secondary display is configured to display content;
    displaying a first content item on the exposed area of the secondary display based on the size of the exposed area of the secondary display; and
    updating the secondary display in response to detecting a change in the size of the exposed area of the secondary display.

2. The method of claim 1, further comprising detecting a movement of a cover of the secondary display.

3. The method of claim 1, wherein:
    the flexible primary display is disposed on a first surface of the foldable electronic device,
    the secondary display is disposed on a second surface of the foldable electronic device, and
    the size of the exposed area of the secondary display is inversely proportional to a magnitude of the folding angle of the flexible primary display.

4. The method of claim 1, further comprising:
    obtaining a quaternion data vector of a first region of the flexible primary display and a quaternion data vector of a second region of the flexible primary display; and
    calculating an inner product of unit vectors associated with the first and second regions by using the quaternion data vectors,
    wherein the folding angle of the flexible primary display is calculated based on the inner product.

5. The method of claim 1, wherein the first content item is displayed on the secondary display in response to detecting that the size of the exposed area meets a threshold.

6. The method of claim 1, wherein displaying the first content item on the secondary display includes displaying a portion of the first content item when the exposed area has a first size and displaying the entire first content item when the exposed area has a second size.

7. The method of claim 1, wherein displaying the first content item on the secondary display includes displaying a text item when the exposed area has a first size and displaying an icon when the exposed area has a second size.

8. The method of claim 1, wherein updating the secondary display includes:
    displaying a second content item concurrently with the first content item when the size of the exposed area is increased; and
    hiding at least some of the first content item from display when the size of the exposed area is decreased.

9. The method of claim 1, wherein updating the secondary display includes replacing the first content item with a second content item.

10. The method of claim 1, wherein a brightness of the secondary display is selected based on the size of the exposed area.

11. An electronic device comprising:
a foldable body;
a flexible primary display formed on one surface of the foldable body;
a secondary display formed on another surface of the foldable body;
a cover arranged to cover or expose the secondary display;
a memory; and
at least one processor operatively coupled to the memory, configured to:
calculate a folding angle of the flexible primary display;
calculate a size of an exposed area of the secondary display based on the folding angle, wherein the exposed area of the secondary display is configured to display content;
display a first content item on the exposed area of the secondary display based on the size of the exposed area of the secondary display; and
update the secondary display in response to detecting a change in the size of the exposed area of the secondary display.

12. The electronic device of claim 11, wherein the at least one processor is further configured to detect a movement of a cover of the secondary display.

13. The electronic device of claim 11, wherein the size of the exposed area of the secondary display is inversely proportional to a magnitude of the folding angle of the flexible primary display.

14. The electronic device of claim 11, wherein the at least one processor is further configured to:
obtain a quaternion data vector of a first region of the flexible primary display and a quaternion data vector of a second region of the flexible primary display;
calculate an inner product of unit vectors associated with the first and second regions by using the quaternion data vectors; and
the folding angle of the flexible primary display is calculated based on the inner product.

15. The electronic device of claim 11, wherein the first content item is displayed on the secondary display in response to detecting that the size of the exposed area meets a threshold.

16. The electronic device of claim 11, wherein displaying the first content item on the secondary display includes displaying a portion of the first content item when the exposed area has a first size and displaying the entire first content item when the exposed area has a second size.

17. The electronic device of claim 11, wherein displaying the first content item on the secondary display includes displaying a text item when the exposed area has a first size and displaying an icon when the exposed area has a second size.

18. The electronic device of claim 11, wherein updating the secondary display includes:
displaying a second content item concurrently with the first content item when the size of the exposed area is increased; and
hiding at least some of the first content item from display when the size of the exposed area is decreased.

19. The electronic device of claim 11, wherein updating the secondary display includes replacing the first content item with a second content item.

20. The electronic device of claim 11, wherein a brightness of the secondary display is selected based on the size of the exposed area.

21. A non-transitory computer readable-medium storing one or more processor-executable instructions which when executed by at least one processor cause the at least one processor to perform a method comprising the steps of:
calculating a folding angle of a flexible primary display;
calculating a size of an exposed area of a secondary display based on the folding angle, wherein the exposed area of the secondary display is configured to display content;
displaying a first content item on the exposed area of the secondary display based on the size of the exposed area of the secondary display; and
updating the secondary display in response to detecting a change in the size of the exposed area of the secondary display.

* * * * *